United States Patent [19]
Ueda et al.

[11] Patent Number: 5,664,072
[45] Date of Patent: Sep. 2, 1997

[54] COLOR CONVERSION DEVICE

[75] Inventors: Masashi Ueda; Ryohei Komiya, both of Nagoya, Japan

[73] Assignee: Brother Kogyo Kabushiki Kaisha, Nagoya, Japan

[21] Appl. No.: 293,511

[22] Filed: Aug. 22, 1994

[30] Foreign Application Priority Data

Aug. 23, 1993 [JP] Japan ................................. 5-230952
Mar. 24, 1994 [JP] Japan ................................. 6-053374

[51] Int. Cl.⁶ .......................... G06K 15/00; G03F 3/08
[52] U.S. Cl. .......................... 395/109; 358/518; 358/523; 358/504
[58] Field of Search .......................... 395/109, 131, 395/107, 101; 358/518, 504, 523, 500, 524; 382/167, 162

[56] References Cited

U.S. PATENT DOCUMENTS

| | | | |
|---|---|---|---|
| 4,500,919 | 2/1985 | Schreiber | 358/518 |
| 5,264,927 | 11/1993 | Miyoshi et al. | 358/527 |
| 5,271,096 | 12/1993 | Cook | 395/109 |
| 5,299,291 | 3/1994 | Ruetz | 395/109 |
| 5,323,249 | 6/1994 | Liang | 358/518 |
| 5,367,387 | 11/1994 | Yamaguchi | 358/518 |
| 5,481,380 | 1/1996 | Bestmann | 358/518 |
| 5,481,655 | 1/1996 | Jacobs | 395/109 |

OTHER PUBLICATIONS

Mitsu Ikeda, "Fundamentals of Color Engineering," Sep. 20, 1980, pp. 133–149.

Primary Examiner—Arthur G. Evans
Assistant Examiner—Tracy M. Legree
Attorney, Agent, or Firm—Oliff & Berridge

[57] ABSTRACT

A color value data conversion device wherein color value data including data for outputting color images is inputted to a CPU. A color conversion characteristic calculation portion calculates a color conversion characteristic values based on the inputted color value data and on a color conversion characteristic values stored in a color conversion characteristic memory provided to a ROM. Afterward, the color conversion portion converts the color value data into a printer control signal based on the calculated color conversion characteristic values.

25 Claims, 17 Drawing Sheets

| ADDRESS | | AD1 | AD2 | ....... | ADn |
|---|---|---|---|---|---|
| SET OF COLOR CONVERSION VALUES | C' | 0 | 20 | ....... | 0 |
| | M' | 20 | 0 | ....... | 30 |
| | Y' | 255 | 255 | ....... | 0 |
| | K' | 120 | 120 | ....... | 0 |

34

| ADDRESS | | AD1 | AD2 | ....... | ADn |
|---|---|---|---|---|---|
| SET OF COLOR CONVERSION CHARACTERISTIC VALUES | L | 1.10 | 1.08 | ....... | 0.89 |
| | a | 0.80 | 0.82 | ....... | 1.12 |
| | b | 1.13 | 1.13 | ....... | 0.87 |

32

| ADDRESS | No1 | No2 | ........ | Nom |
|---|---|---|---|---|
| COLOR CONVERSION STATE VALUE | 1 | 2 | ........ | 1 |

| ADDRESS | | Po1 | Po2 | ------- | Poi |
|---|---|---|---|---|---|
| FIRST WEIGHT COEFFICIENT | WA | 1 | 0.67 | ------- | 0 |
| | WB | 0 | 0.33 | ------- | 0 |
| | WC | 0 | 0 | ------- | 0 |
| | WD | 0 | 0 | ------- | 0 |
| | WE | 0 | 0 | ------- | 0 |
| | WF | 0 | 0 | ------- | 0 |
| | WG | 0 | 0 | ------- | 0 |
| | WH | 0 | 0 | ------- | 1 |

142 →

| ADDRESS | | Po1 | Po2 | ------- | Poi |
|---|---|---|---|---|---|
| SECOND WEIGHT COEFFICIENT | WA | 1 | 0.91 | ------- | 0 |
| | WB | 0 | 0.55 | ------- | 0 |
| | WC | 0 | 0 | ------- | 0 |
| | WD | 0 | 0 | ------- | 0 |
| | WE | 0 | 0 | ------- | 0 |
| | WF | 0 | 0 | ------- | 0 |
| | WG | 0 | 0 | ------- | 0 |
| | WH | 0 | 0 | ------- | 1 |

144 →

| ADDRESS | | Po1 | Po2 | ------- | Poi |
|---|---|---|---|---|---|
| THIRD WEIGHT COEFFICIENT | WA | 0.97 | 0.57 | ------- | 0 |
| | WB | 0.05 | 0.40 | ------- | 0.05 |
| | WC | 0.05 | 0.05 | ------- | 0.05 |
| | WD | 0.05 | 0.05 | ------- | 0.05 |
| | WE | 0.05 | 0.05 | ------- | 0.05 |
| | WF | 0.05 | 0.05 | ------- | 0.05 |
| | WG | 0.05 | 0.05 | ------- | 0.05 |
| | WH | 0 | 0.05 | ------- | 0.97 |

| LATTICE POINT ADDRESS | DISTORTION AMOUNT DATA | | |
|---|---|---|---|
| | h | v | c |
| — | — | — | — |
| — | — | — | — |
| A | 0.50 | 1.00 | 1.25 |
| B | 0.55 | 1.00 | 1.20 |
| C | 0.60 | 1.00 | 1.18 |
| D | 0.65 | 1.00 | 1.15 |
| E | 0.70 | 1.00 | 1.13 |
| F | 0.80 | 1.00 | 1.08 |
| G | 0.90 | 1.00 | 1.03 |
| H | 1.00 | 1.00 | 9.95 |
| — | 1.10 | 1.00 | 9.87 |

COLOR CONVERSION DEVICE

BACKGROUND OF THE INVENTION

1. Field of the Invention

The present invention relates to a color conversion device for converting a set of input color data into a set of print control data for controlling a printer.

2. Description of the Related Art

Conventionally, when reproducing a color image on print sheet using a printer, a color image of a previously printed sample is first picked up by a scanner to obtain set of color values (R, G, B) where R, G and B represent red, green and blue color components of the sample color image picked up by the scanner. Then, the set of color values G, B) is converted into a set of print control data (C, M, Y, K) where C, M, Y and K represents cyan, magenta, yellow and black components. The printer is controlled by the print control data (C, M, Y, K) to print out a color image corresponding to the color image.

There is the case, however, where the coloring materials (for example, colored toners) used in the printer to reproduce colors are different from the coloring materials used to reproduce the sample color image. In this case, it is impossible to produce a color image that resembles the sample color image.

Recently, networks, incorporating various scanners and printers for processing color images, have become popular in offices and other work areas. However, two different types of devices, for example, two different types of scanners, obtain different values of red (R), green (G), and blue (b) color components, even though picking up the same color image. Similarly, the same colors can not be reproduced by different types of printers even when both are controlled to be driven according to the same print control data (C, M, Y, K). Thus, color images with substantially the same color tones can not be printed out, unless all devices used for color image processes, that is, the scanner by which the color value data is taken and the printer by which the image is printed, are known.

To solve this problem, so-called device independent color systems have been proposed. The device independent color systems attempt to represent colors by color data defined in colorimetric systems determined by the Commission Internationale de L'Eelarage (CIE) and other organizations. In the CIE system, for example, coordinates are assigned to colors according to their appearance under a standard illumination as viewed by a standard observer.

The primaries theory establishes that all colors can be expressed by mixing combinations of red, green, and blue color components. Colors can generally be expressed by a coordinate system made from three axes. Various methods have been provided for expressing colors according to locations of the colors determined by the three axes. Colorimetric systems formed from the three axes are termed color space. Colors can be expressed in the form of coordinate values in the color space. The color space coordinate axes are formed to depend on, for example, the amount of stimulus to the cone cells on the retina of the human eye, and not on the characteristics of a device. In this way, a color index can be produced that does not depend on characteristics of a device. This is the thinking behind the device independent color system.

Although the general colors of a sample can be determined using color spaces, there are practical limits to the amount of information the set of color data can indicate. Because colors of the color image sample can not be indicated with complete accuracy, the outputted colors differ from the sample colors to some degree. Additionally, the distance between two colors within a color space sometimes bears little relationship to the actual difference in the colors as perceived by the human eye. Therefore, a minute difference within the color space can translate into a perception of greatly differing colors. As a result, desired colors may be difficult to reproduce. Many varieties of color space attempt to reduce the difference between a color indicated by the color space and the perception of that color by the human eye. Many color spaces, such as CIE Luv and CIE Lab, have been provided and put into practical application. These types of color spaces have been termed uniform color spaces.

However, even uniform color spaces such as CIE Luv and CIE Lab are unable to completely represent the perception of the human eye. Determining the distortions in MacAdam's color differentiation ellipses (see FIGS. 1 and 3) and the Munsell notation system (see FIGS. 2 and 4) can be used as gauges for judging to what degree a uniform color space represents the perception of the human eye. MacAdam's color differentiation ellipse is appropriate for determining uniformity in a region with an extremely small color difference. On the other hand, the Munsell notation system is appropriate for determining uniformity in a region with an extremely large color difference. MacAdam's color differentiation ellipses indicate uniformity by the degree to which an ellipse is circular. The more circular the ellipse, the greater the uniformity. Uniformity is best in the Munsell notation system the greater the uniform chroma lines, which indicate regions where color chroma is equal, are formed in concentric circles with a uniform interval between the lines, and the straighter the radial equivalent hue lines are and the more evenly they divide 360°.

Distortion in a CIE 1976 L*u*v* uniform color space is judged by both the MacAdam's color differentiation ellipses and the Munsell notation system. Results are shown in FIGS. 1 and 2, respectively. Similarly, distortion in a CIE 1976 L*a*b* uniform color space is judged by both the MacAdam's color differentiation ellipses and the Munsell notation system. Results are shown in FIGS. 3 and 4. These results indicate that the CIE 1976 L*a*b* color space is distorted greater than the CIE 1976 L*u*v* color space according to the MacAdam's color differentiation ellipses, and that the CIE 1976 L*u*v* color space is distorted greater than the CIE 1976 L*a*b* color space according to the Munsell notation system. These results therefore show that the CIE 1976 L*u*v* color space is more uniform than the CIE 1976 L*a*b* color space, in their regions with extremely small color differences, and the CIE 1976 L*a*b* color space is more uniform than the CIE 1976 L*u*v* color space in their regions with extremely large color differences. These results have been described by Mitsuo Ikeda in "Fundamentals of Color Engineering", Asakura Publishers, published on Sep. 20, 1980.

Thus, there are minute shifts and distortions in the uniform color spaces in regards to the perception of the human eye. Performing color conversion without considering these distortions translates into reproductions of images that have shifts and distortions in regards to the perception human eye. This produces the problem wherein desired images can not be accurately obtained in regards to the human visual sense.

SUMMARY OF THE INVENTION

It is therefore an objective of the present invention to overcome the above-described problems and to provide a color conversion device for converting a set of input color data into a set of print control data that enables to control the printer to reproduce a color the same as a color represented by the set of input color data in regards to human visual sense.

It is another objective of the present invention to provide a color conversion device for converting a set of input color data into a set of print control data that enables to control the printer to reproduce a color that has any desired color relationship with respect to a color represented by the set of input color data in regards to human visual sense.

In order to attain the above objects and other objects, the present invention provides a color data conversion device for converting a set of input color data into a set of print control data for controlling a printing device, the color data conversion device comprising: input means for inputting a set of input color data representing a desired color defined in a uniform color space; color conversion means for converting the set of input color data into a set of print control data, while correcting distortion in the uniform color space, so as to produce the set of print control data capable of controlling the printing device to print out the same color as the desired color; and output means for outputting the set of print control data to a printing device so as to control the printing device by the print control data to print out the same color as the desired color.

The uniform color space may be defined in a CIE 1976 Lab system. The uniform color space may be defined in a CIE 1976 Luv system.

The color conversion means may preferably convert the set of input-color data into the set of print control data, while correcting the distortion in the uniform color space in regards to human visual sense, so as to produce the set of print control data capable of controlling the printing device to print out the same color as the desired color in regards to the human visual sense.

The color conversion means may preferably include: storing means for storing information on a distortion degree by which the uniform color space is distorted; and converting means for converting the set of input color data in a manner determined dependently on the distortion degree of the uniform color space.

The uniform color space may be divided into a lattice to define a plurality of lattice color points, an input color point defined by the set of input color data being located in the lattice. The storing means may preferably include: a distortion degree data table for storing a plurality of sets of lattice distortion degree data for the plurality of lattice color points, each set of lattice distortion degree data representing a distortion degree by which the uniform color space is distorted at an area around corresponding one of the plurality of lattice color points.

The set of lattice distortion degree data for each lattice color point may be defined by a ratio of a first color distance defined in the uniform color space between the corresponding lattice color point and a first color point and a second color distance defined in the uniform color space between the corresponding lattice color point and a second color point, the first color point and the second color point being separated from the corresponding lattice color point in opposite directions by the same color difference as perceived by human visual sense. The set of lattice distortion degree data for each lattice color point may also be defined dependently on MacAdam's color differentiation ellipses. The set of lattice distortion degree data for each lattice color point may also be defined dependently on Munsell notation system.

According to another aspect, the present invention provides a color data conversion device for converting a set of input color data into a set of print control data for controlling a printing device, the color data conversion device comprising: input means for inputting a set of input color data representing a desired input color defined in a uniform color space; color conversion means for converting the set of input color data into a set of print control data representative of an output color having a predetermined color relationship with respect to the desired input color, the color relationship being predetermined in correspondence with the desired input color, to thereby produce the set of print control data capable of controlling the printing device to print out the output color; and output means for outputting the set of print control data to a printing device so as to control the printing device by the print control data to print out the output color.

According to a further aspect, the present invention provides a color data conversion device for converting an input color data into a print control data for controlling a printing device, the color data conversion device comprising: input means for inputting an input color data representing a desired input color; color conversion characteristic determination means for determining a color conversion characteristic, based on the input color data; conversion means for converting the input color data into a print control data, in a conversion manner having the determined color conversion characteristic; and output means for outputting the print control data to a printing device.

BRIEF DESCRIPTION OF THE DRAWINGS

The above and other objects, features and advantages of the invention will become more apparent from reading the following description of the preferred embodiments taken in connection with the accompanying drawings in which:

FIG. 20 shows the contents of the first, second and third weight coefficient memories 140, 142 and 144;

FIG. 24 shows the content of a distortion amount memory 222 of FIG. 23; and

DETAILED DESCRIPTION OF THE PREFERRED EMBODIMENTS

Figure 1:
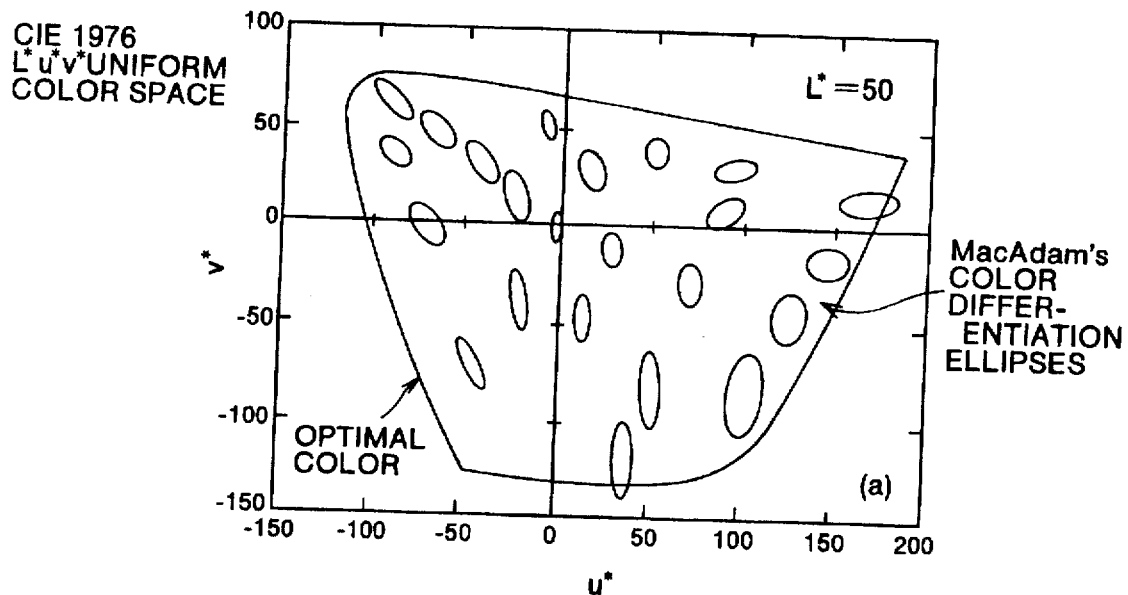
FIG. 1 shows that the MacAdam's color differentiation ellipses indicate the state how the CIE 1976 L*u*v* uniform color space is distorted.
Figure 2:
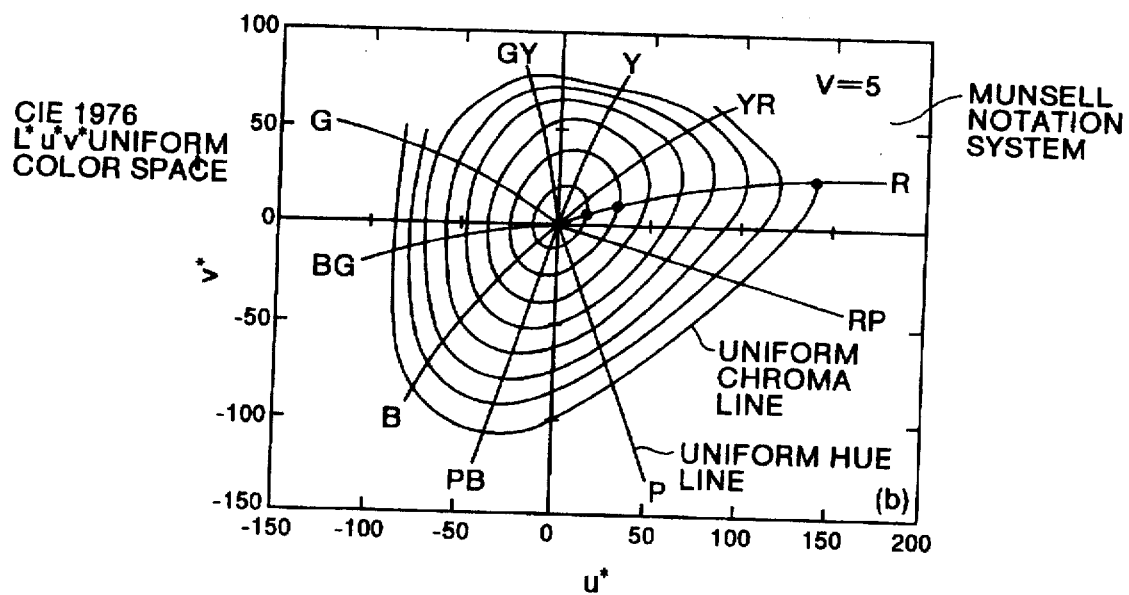
FIG. 2 shows that the uniform chroma lines and the uniform hue lines of the Munsell notation system indicate the state how the CIE 1976 L*u*v* uniform color space is distorted.
Figure 3:
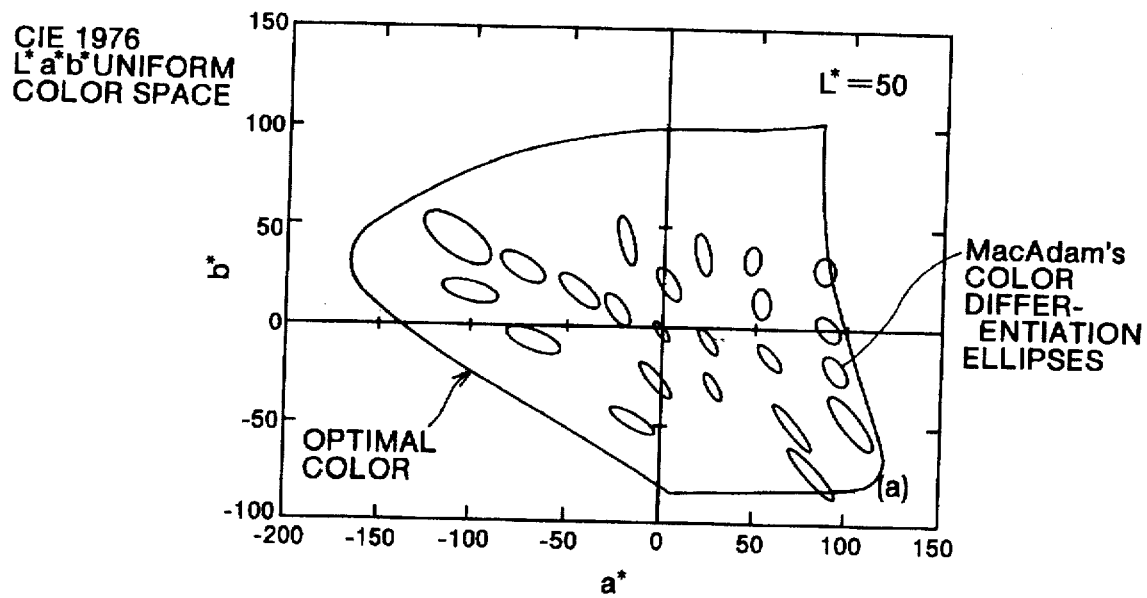
FIG. 3 shows that the MacAdam's color differentiation ellipses indicate the state how the CIE 1976 L*a*b* uniform color space is distorted.
Figure 4:
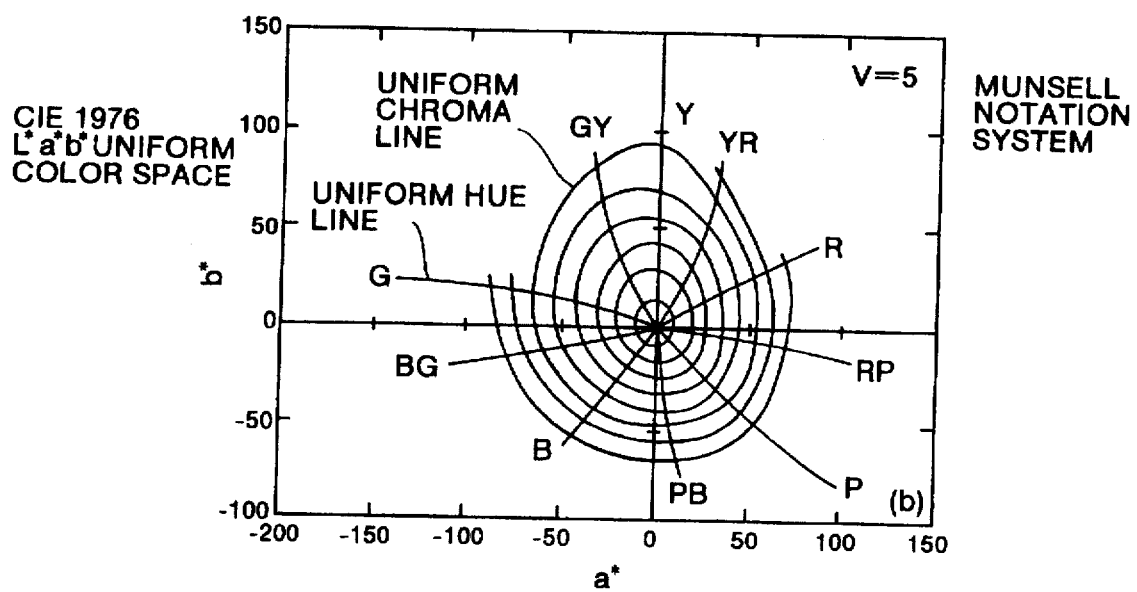
FIG. 4 shows that the uniform chroma lines and the uniform hue lines of the Munsell notation system indicate the state how the CIE 1976 L*a*b* uniform color space is distorted.

A color data conversion device for converting a set of input color data into a set of print control data for a printer according to first through third preferred embodiments of the present invention will be described while referring to the accompanying drawings wherein like parts and components are designated by the same reference numerals to avoid duplicating description.

The color data conversion device according to the first through third preferred embodiments of the present invention is for converting a set of input color data into a set of print control data, according to a device independent color system. More specifically, the set of input color data inputted into the color data conversion device is defined in a uniform color space according to CIE 1976 L*a*b* (referred to as "LabZ," hereinafter) system defined by the CIE.

Figure 5:
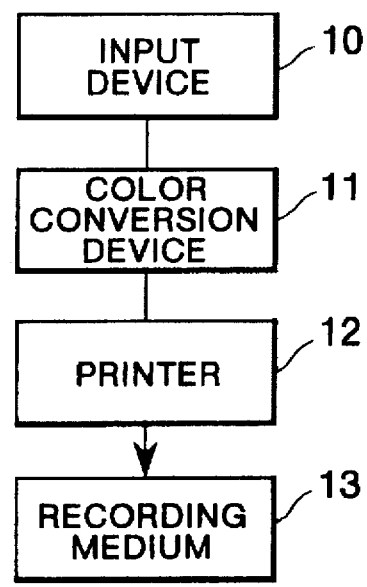
FIG. 5 is a block diagram showing that a color conversion device of first and second embodiments of the present invention converts input color data into print control data.

As shown in FIG. 5, the color conversion device 11 of the present embodiment is generally connected to an input device 10 for receiving a set of input color data. The color conversion device 11 is for converting the set of input color data into a set of print control data, and for outputting the set of print control data to a printer 12. The set of print control data is for controlling the printer 12 to print out a color on recording medium 13 such as a print sheet.

With this arrangement, a set of input color data (Li, ai, bi) is supplied from an external source (not shown) to the input device 10. The set of input color data (Li, ai, bi) is defined in the Lab uniform color space LabZ. The color conversion device 11 converts this set of input color data (Li, ai, bi) into a set of print control data (C, M, Y, K). The set of print control data (C, M, Y, K) consists of data for cyan (C), magenta (M), yellow (Y) and black (K) color components. The set of print control data is outputted to the printer 12, which prints the corresponding color on the print medium 13.

Figure 6:
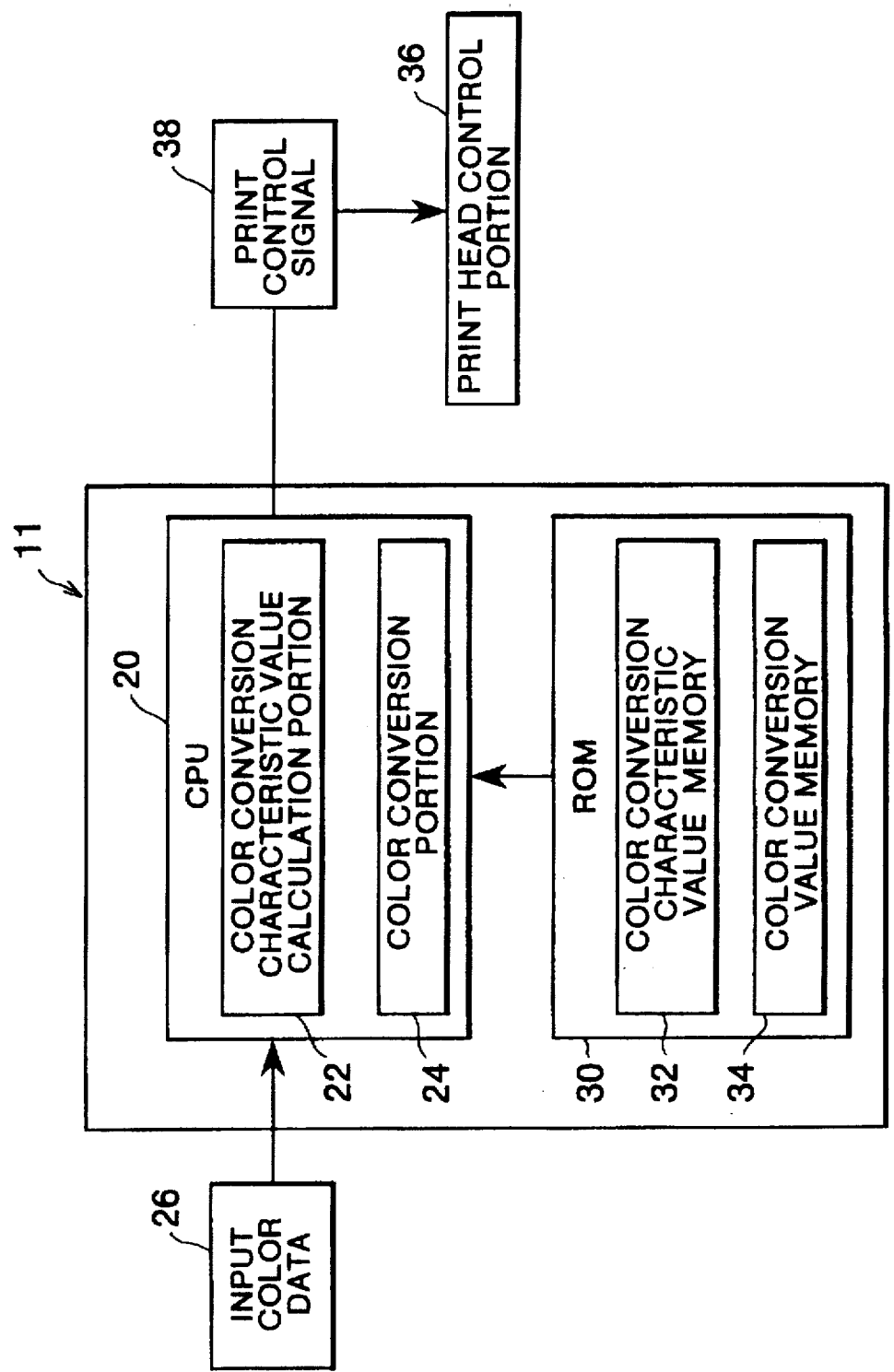
FIG. 6 is a block diagram of a color conversion device of a first embodiment of the present invention.

Next, a detailed explanation of the structure of the color conversion device 11 will be provided while referring to FIG. 6.

The color conversion device 11 includes a CPU 20 and a ROM 30 in electrical connection with each other. The CPU 20 is connected to the input device 10 for receiving a set of input color data. The CPU 20 is also connected to a print head control portion 36 of the printer 12 for transmitting the converted set of print control data 38. The CPU 20 includes a color conversion portion 24 and a color conversion characteristic value calculation portion 22. The ROM 30 includes a color conversion characteristic value memory 32 and a color conversion value memory 34.

Figure 7:
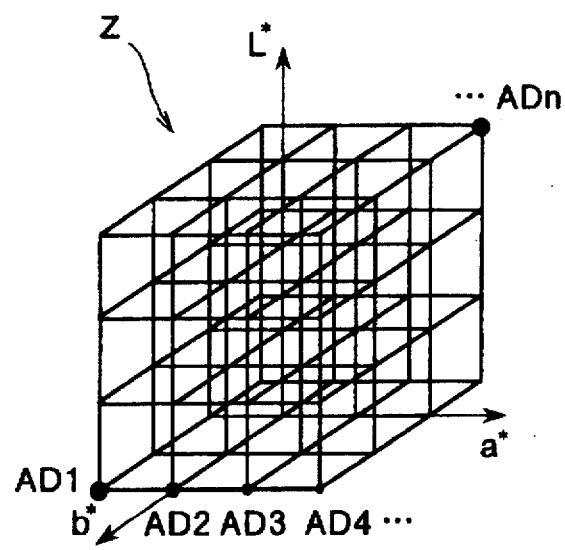
FIG. 7 illustrates a uniform color space divided into a lattice.

In this color conversion device 11, a uniform color space LabZ is defined to be divided into a lattice with uniform intervals of optional extent, as shown in FIG. 7. Points of intersection in the lattice (referred to as "lattice points," hereinafter) are provided with lattice numbers (AD1, AD2, . . . ADn). It is noted that the a and b axes of the uniform color space LabZ actually extend infinitely, with no maximum or minimum values. Therefore, in the color conversion device 11, the uniform color space LabZ is limited to a color range that can be expressed by all the sets of input color data inputtable from the input device 10. This color range is thus preinvestigated, and maximum and minimum values are set so as to completely cover the color range. The minimum values are referred to as Lmin, amin and bmin, hereinafter.

Figures 8, 9, 10:
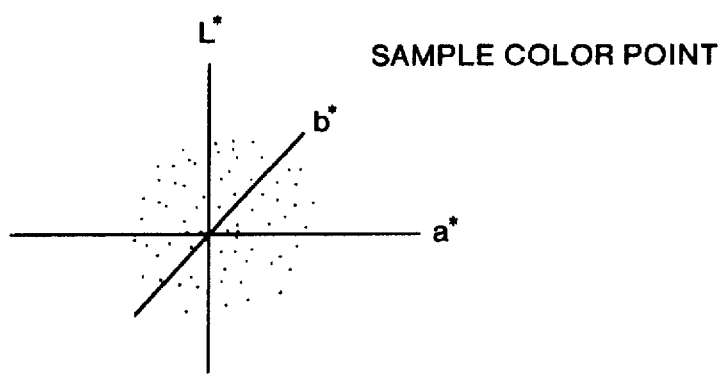
FIG. 8 shows the content of a color conversion value memory 34 of FIG. 6.
FIG. 9 shows the content of a color conversion characteristic value memory 32 of FIG. 6.
FIG. 10 illustrates how the sample color points measured in the experimentation are distributed in the uniform color space.

The color conversion value memory 34 stores therein a set of color conversion values (C', M', Y', K') for each of all the lattice points in the color range of the uniform color space LabZ, as shown in FIG. 8. That is, the memory 34 stores the plurality of sets of color conversion values, at addresses determined by the lattice numbers AD1, AD2, .... ADn. Each set of color conversion values (C', M', Y', K') corresponds to a set of print control data (C, M, Y, K) for controlling the printer 12 to print out a color represented by the corresponding lattice point. All the sets of color conversion values are previously determined through experimentation with the use of the arrangement of FIG. 5.

The color conversion characteristic value memory 32 stores therein a set of color conversion characteristic values (L, a, b) for each of all the lattice points in the color range of the uniform color space LabZ, as shown in FIG. 9. That is, the memory 32 stores the plurality of sets of color conversion characteristic values, at addresses determined by the lattice numbers AD1, AD2, . . . ADn. Each set of color conversion characteristic values represents a degree to which the Lab color space around the corresponding lattice point is distorted in view of the human visual sense, and therefore is used for correcting the distortion between colors around the corresponding lattice point color in the uniform color space and corresponding colors as perceived by the human visual sense. The sets of color conversion characteristic values may be obtained through calculation based on data of, for example, MacAdam's color differentiation ellipses or Munsell notation system. The sets of color conversion characteristic values may be obtained also through experimentation with the use of the arrangement of FIG. 5.

Following is a concrete example of an experimentation attained for previously determining the sets of color conversion values and the sets of color conversion characteristic values with the use of the system of FIG. 5.

Now assume that the printer 12 of this example is of a type that can print with 256 graduations in amount of each of the cyan (C), magenta (M), yellow (Y) and black (K) components. The value of the black component (K) is automatically provided with a value equal to the smallest one of the values of the other three color components. This can be represented by the following equation:

$K=min(C, M, Y)$, where $min( , , )$ is the function for selecting the minimum value from the three data enclosed by the parenthesis.

In the experimentation, the printer 12 is supplied with a plurality of sets of print control data (C, M, Y, K), so that the printer 12 prints out a plurality of sample colors on the print medium 13. It is noted that the plurality of sets of print control data (C, M, Y, K) are prepared, by changing each of the values C, M, Y and K from 0 to 255 at 16 value intervals. Examples of the thus prepared sets of print control data include (0, 16, 32, 0), (160, 255, 122, 122), etc. Accordingly, the total number of the thus prepared sets of print control data is $17^3=4,913$. Thus, printer 12 prints out the total number of 4,913 different sample colors.

Then, all the printed sample colors are measured using a colorimeter (not shown). The colorimeter produces a plurality of sets of sample color data (Ls, as, bs), each set representing a corresponding sample color in terms of the uniform color space LabZ. In other words, each set of sample color data ($L_r$, $a_r$, $b_r$) defines a sample color point in the Lab uniform color space LabZ. As shown in FIG. 10, the sample color points for all the sample colors are therefore located to be distributed in the uniform color space LabZ which is divided into the lattice.

Figure 11:
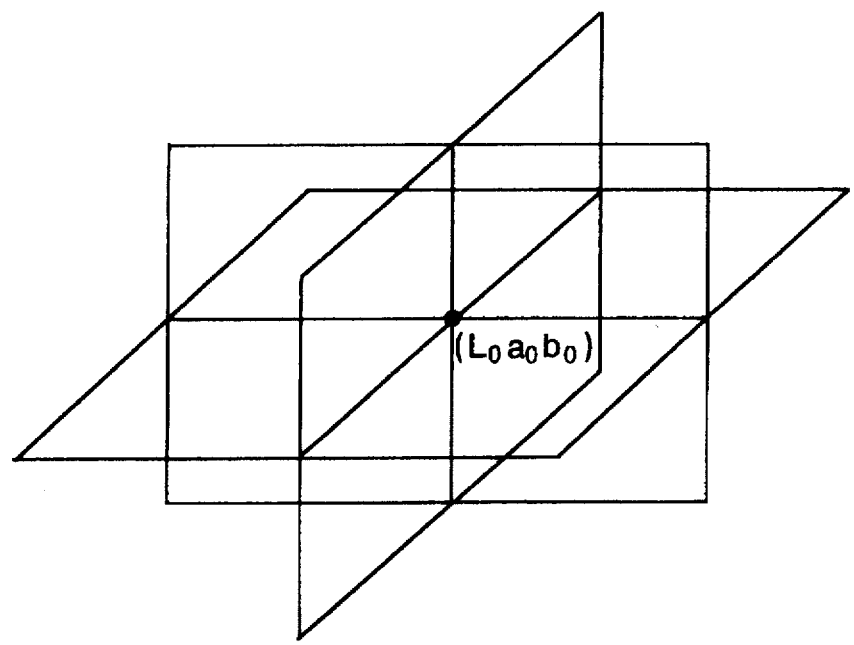
FIG. 11 illustrates how the color space around each lattice point is divided into eight spatial sections.

Now, each of all the lattice points (which will be referred to as a "particular lattice point," hereinafter) is defined by a set of Lab color values ($L_0$,$a_0$,$b_0$) in the lattice space. The Lab color space around the particular lattice point is then divided into eight spatial sections by imaginary planes that are perpendicular to the L, a and b axes and that all pass through the particular lattice point, as shown in FIG. 11. Each of the eight spatial sections are numbered Si ($i=1$ through 8), for example. Several sample color points are distributed in each of the eight spatial sections S1 through S8. Then, from the several sample color points located in each spatial section Si ($i=1$ through 8), one sample color point that is located closest to the particular lattice point ($L_0$, $a_0$, $b_0$) is selected. The sample color point thus selected from each spatial section Si ($i=1$ through 8) will be referred to as a selected sample color (Li, ai, bi) where $i=1$ through 8, hereinafter. The set of print control data (C, M, Y, K) which has been used for printing the selected sample color from each spatial section Si will be referred to as (Ci, Mi, Yi, Ki) where $i=1$ to 8, hereinafter.

Then, the distance from the particular lattice point ($L_0$, $a_0$, $b_0$) to the selected sample color point (Li, ai, bi) at each section Si is calculated by the following formula (1):

$$E_i = \sqrt{(L_i - L_0)^2 + (a_i - a_0)^2 + (b_i - b_0)^2} \quad (1)$$

where $i=1$ to 8.

Then, a set of print control data (C, M, Y, K) is calculated for the particular lattice point ($L_0$, $a_0$, $b_0$), by the following formulas (2).

$$C_0 = \sum_{i=1}^{8} (C_i/E_i \times All) \quad (2)$$

$$M_0 = \sum_{i=1}^{8} (M_i/E_i \times All)$$

$$Y_0 = \sum_{i=1}^{8} (Y_i/E_i \times All)$$

$$K_0 = min(C_0, M_0, Y_0)$$

where $$ALL = \sum_{i=1}^{8} \frac{1}{E_i}$$

Thus obtained print control data ($C_0$, $M_0$, $Y_0$, $K_0$) can properly control the printer 12 to print out a color represented by the particular lattice point ($L_0$,$a_0$, $b_0$). Thus, a set of print control data ($C_0$, $M_0$, $Y_0$, $K_0$) is obtained for each of all the lattice points ($L_0$, $a_0$, $b_0$).

Then, the set of print control data ($C_0$, $M_0$, $Y_0$, $K_0$) for each lattice point ($L_0$, $a_0$, $b_0$) is converted into a set of color conversion values ($C_0'$, $M_0'$, $Y_0'$, $K_0'$) using the following formulas (3):

$$K_0'=K_0$$

$$C_0'=(C_0-K_0')\times 255/(255-K_0') \quad (3)$$

$$M_0'=(M_0-K_0')\times 255/(255-K_0')$$

$$Y_0'=(Y_0-K_0')\times 255/(255-K_0')$$

Thus, the sets of color conversion values (C', M', Y', K') are obtained for all the lattice points and are stored in the color conversion value memory 34 as shown in FIG. 8 at addresses of the corresponding lattice numbers AD1, AD2, ... ADn.

When all the sets of color conversion values are thus obtained to be stored in the memory 34, the sets of color conversion characteristic values are obtained, as follows:

First, a set of color conversion values (C', M', Y', K') now stored at an address of each lattice point (which will be referred to as a "particular lattice point," hereinafter) is reconverted by the following formulas (4) into a set of print control data (C, M, Y, K) for the particular lattice point:

$$K=K'$$

$$C=(C'/255)\times(255-K')+K' \quad (4)$$

$$M=(M'/255)\times(255-K')+K'$$

$$Y=(Y'/255)\times(255-K')+K'$$

The set of print control data (C, M, Y, K) for the particular lattice point is then inputted to the printer 12. As a result, the printer 12 prints out the particular lattice point color ($L_0$, $a_0$, $b_0$).

Figure 12:
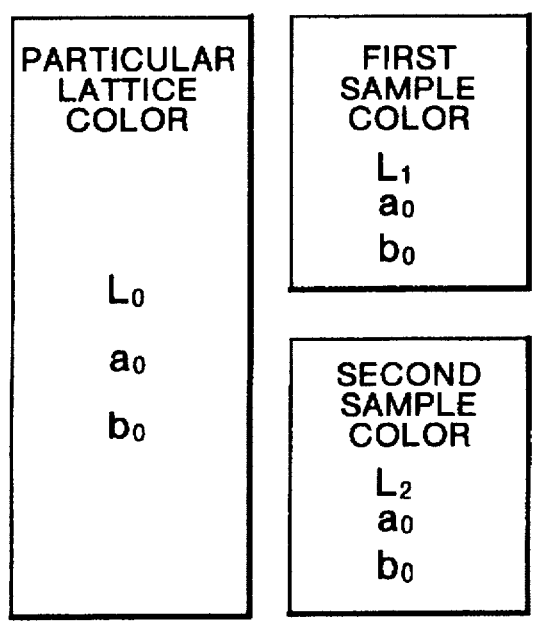
FIG. 12 illustrates how the particular lattice color printed on the print medium 13 and the first and second sample colors also printed on the print medium 13 are located to be observed by an observer in the experimentation.

Thus printed particular lattice point color ($L_0$, $a_0$, $b_0$) is then located as shown in FIG. 12. Then, from the previously-prepared many sample colors, one sample color ($L_1$, $a_0$, $b_0$), with its value $L_1$ being shifted from the value $L_0$ in a positive direction along the L axis, is selected out. This sample color will be referred to as a "first sample color," hereinafter. The first sample color is located in the vicinity of the lattice point color, as shown in FIG. 12. Then, also from the previously-prepared many sample colors, other several sample colors ($L_2'$, $a_0$, $b_0$), with their values $L_2'$ being shifted from the value $L_0$ in a negative direction along the L axis are selected out. These sample colors will be referred to as "second sample colors," hereinafter. Thus selected several second sample colors are located, one by one, in the vicinity of the lattice point color as shown in FIG. 12. Then, an observer observes the relationship between a color difference observed between the first sample color and the lattice point color and a color difference observed between each of the several second sample colors and the lattice point color. Then, the observer selects one of the second sample colors, with its color difference from the lattice point color being perceived to be the same as the color difference between the first sample color and the lattice point color. This selected sample color will be referred to as a set of values ($L_2$, $a_0$, $b_0$), hereinafter. If the color space LabZ around the particular lattice point ($L_0$, $a_0$, $b_0$) is completely uniform in the L axis direction with respect to the human visual sense, the color distance $L_0$–$L_2$ between the value $L_2$ and $L_0$ should be equal to the color distance $L_m$–$L_0$ between the value $L_1$ and $L_0$. On the other hand, if the color space LabZ around the particular lattice point ($L_0$, $a_0$, $b_0$) is distorted, the distance $L_0$–$L_2$ between the value $L_2$ and $L_0$ is different from the distance $L_1$–$L_0$ between the value $L_1$ and $L_0$. The degree by which the color space LabZ around the particular lattice point ($L_0$, $a_0$, $b_0$) is distorted in the L axis direction can therefore be represented by the following formula (5):

$$L = \frac{L_1 - L_0}{L_0 - L_2} \quad (5)$$

According to the present embodiment, this coefficient L is used as an L-component of a set of color conversion characteristic values (L, a, b) for the particular lattice point, shown in FIG. 9. The value L representative of the degree of distortion of the color space in the L axis direction at the particular lattice point is used to correct the distortion around the corresponding lattice point in the L axis direction.

Thus, the L-component of the set of color conversion characteristic values (L, a, b) is obtained for each of all the lattice points. The a-component a and the b-component b of the set of color conversion characteristic values (L, a, b) for each of all the lattice points are obtained in the same manner as described above. It is noted that the values a and b for each lattice point represent the degrees by which the color space around the corresponding lattice point are distorted in the a and b axis directions, respectively. Accordingly, the values a and b are used to correct the distortions around the corresponding lattice point in the a and b axis directions.

Thus, the sets of color conversion characteristic values (L, a, b) are obtained for all the lattice points and are stored in the color conversion characteristic value memory 32 as shown in FIG. 9 at addresses of the corresponding lattice numbers AD1, AD2, ... ADn.

The color conversion device 11 having the above-described structure operates as described below.

Figure 13:
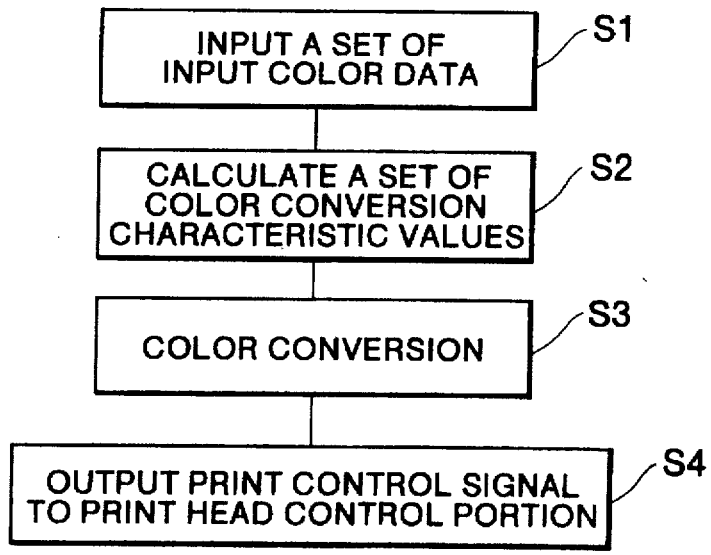
FIG. 13 is a flow chart illustrating the operation of the color conversion device of the first embodiment.

As shown in FIG. 13, a set of input color data (Li, ai, bi) 26 representative of a desired color is inputted to the input device 10, in step S1. The input color data (Li, ai, bi) represents an input color point P located in the Lab uniform color space LabZ at a position (Li, ai, bi). Then, in step S2, the color conversion characteristic value calculation portion 22 of the CPU 20 calculates a set of color conversion characteristic values (PL, Pa, Pb) for the input color data (Li, ai, bi) 26, by interpolating eight sets of color conversion characteristic values (L, a, b) predetermined for eight lattice points surrounding the input color data P and stored in the memory 32. Then, in step S3, the color conversion portion 24 in the CPU 20 calculates a set of print control data (Pc, Pm, Py, Pk) 38 for the input color data (Li, ai, bi), by reconverting eight sets of color conversion values (C', M', Y', K') predetermined for the eight lattice points and stored in the memory 34 into eight 5 sets of print control data (C, M, Y, K) and then interpolating the eight sets of print control data (C, M, Y, K) with weight coefficients determined dependently on the set of color conversion characteristic values (PL, Pa, Pb) already calculated in the step S2. The calculated set of print control data (Pc, Pm, Py, Pk) 38 is outputted to the print head control portion 36 in step S4. The printer 12 is controlled by the print control data (Pc, Pm, Py, Pk) to print out the desired color on the print medium 13.

Operations in the step S2 for calculating the set of color conversion characteristic values (PL, Pa, Pb) for the input color data (Li, ai, bi) will be described below while referring to FIGS. 14 and 15.

First, the color conversion characteristic value calculating portion 22 receives the set of input color data (Li, ai, bi) 26 of the desired color from the input device 10. The set of input color data (Li, ai, hi) represents the color point P located in the Lab uniform color space LabZ at a position defined by coordinates values of Li, ai and bi. The color space LabZ is uniformly divided into a lattice with predetermined intervals of Lstep, astep and bstep along the L, a and b axis directions, respectively. Accordingly, the lattice forms many cubes arranged uniformly in the L, a and b axis directions. The color point P resides in a specific cube J as shown in FIG. 14. The cube J is defined by eight lattice points A, B, C, D, E, F, G, and H surrounding the color point J.

The coordinates (Lno, ano, bno) for the lattice point A of the cube J, in which the color point P resides, are calculated using the following formula (6):

$L\ no=(int)\ ((Li-Lmin)/L\ step)$ $a\ no=(int)\ ((ai-amin)/a\ step)$ \quad (6)

$b\ no=(int)\ ((bi-bmin)/b\ step)$ where Lmin, amin, and bmin are the already-described minimal coordinates values of the color range of the lattice space; and (int) are processes for rounding off the decimal point to form integers.

When the lattice point A is thus identified, the other seven lattice points B through H are easily identified. The calculation portion 22 then retrieves, from the memory 2, the eight sets of color conversion characteristic values (AL, Aa, Ab), (BL, Ba, Bb), ... , and (HL, Ha, Hb) that are stored at the addresses of the lattice point numbers of thus identified eight lattice points A, B, ... , and H.

Figure 15:
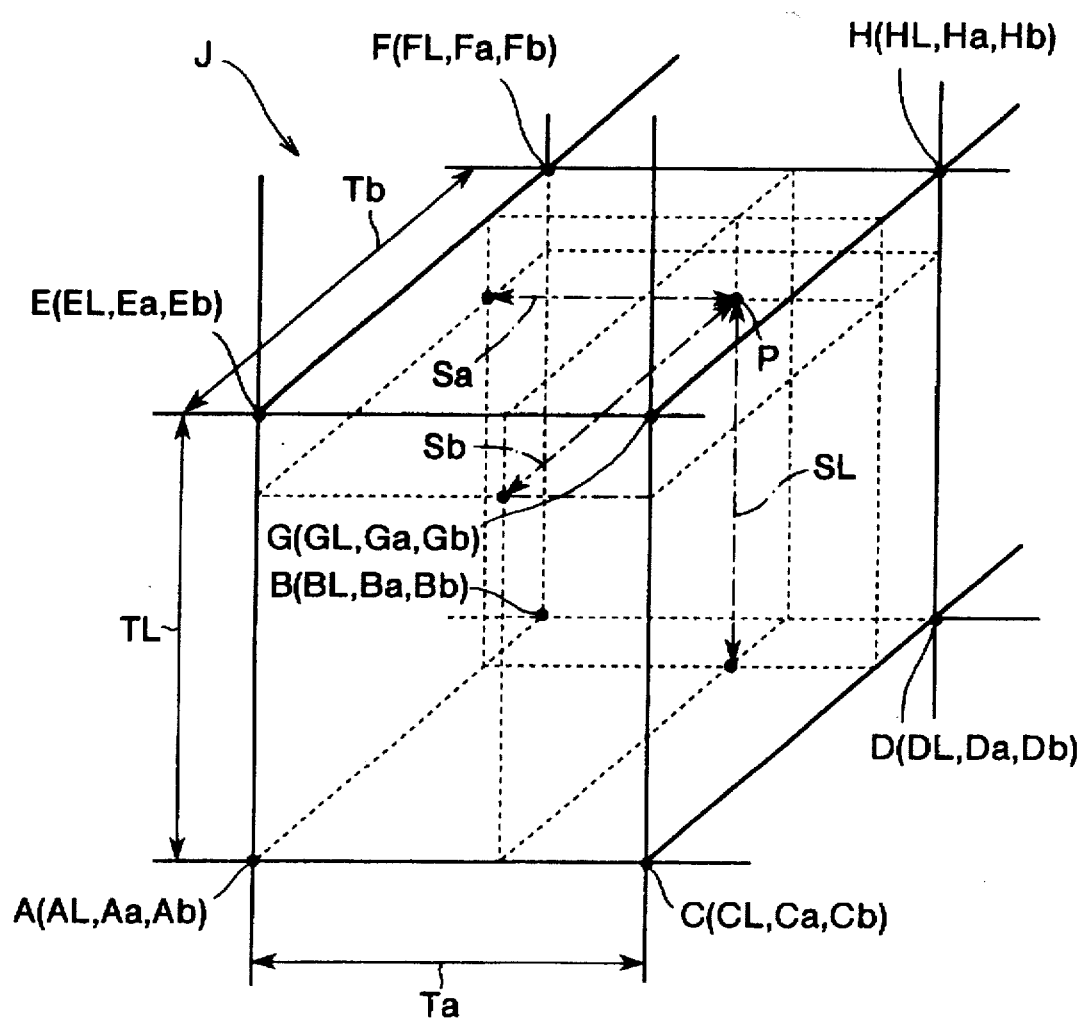
FIG. 15 illustrates the manner of calculating a set of color conversion characteristic values (PL, Pa, Pb) for the input color point P, based on the eight sets of color conversion characteristic values (AL, Aa, Ab), (BL, Ba, Bb), . . . and (HL, Ha, Hb)

Then, as illustrated in FIG. 15, the calculation portion 22 calculates the set of conversion characteristic values (PL, Pa, Pb) for the input color point P, by interpolating the eight sets of color conversion characteristic values (AL, Aa, Ab), (BL, Ba, Bb), ... , and (HL, Ha, Hb) for the eight lattice points A–H, with the following formulas (7):

$PL=WA \times AL+WB \times BL+WC \times CL+WD \times DL+WE \times EL+WF \times FL+WG \times GL+WH \times HL,$ $Pa=WA \times Aa+WB \times Ba+WC \times Ca+WD \times Da+WE \times Ea+WF \times Fa+WG \times Ga+WH \times Ha,$ \quad (7)

$Pb=WA \times Ab+WB \times Bb+WC \times Cb+WD \times Db+WE \times Eb+WF \times Fb+WG \times Gb+WH \times Hb,$ where, WA, WB, ..., WH are weight coefficients determined for the eight lattice points A–H, respectively. It is noted that the Weight, coefficients WA, WB, ..., WH are calculated by the following formulas (8):

$$WA=(TL-SL)\times(Ta-Sa)\times(Tb-Sb)/Vol$$

$$WB=(TL-SL)\times(Ta-Sa)\times Sb/Vol$$

$$WC=(TL-SL)\times Sa\times(Tb-Sb)/Vol$$

$$WD=(TL-SL)\times Sa\times Sb/Vol$$

$$WE=SL\times(Ta-Sa)\times(Tb-Sb)/Vol \quad (8)$$

$$WF=SL\times(Ta-Sa)\times Sb/Vol$$

$$WG=SL\times Sa\times(Tb-Sb)/Vol$$

$$WH=SL\times Sa\times Sb/Vol$$

wherein TL, Ta, Tb are the lengths of the cube J along the L, a, and b axes, respectively, and therefore are equal to the Lstep, astep and bstep of the lattice intervals;

SL, Sa, and SB are the color differences between the input color point (Li, ai, bi) and the lattice point A ($L_A$, $a_A$, $b_A$) along the L, a, and b axis directions, respectively, and therefore SL=Li–$L_A$, Sa=ai–$a_A$, and Sb=bi–$b_A$; and Vol is the volume of the cube J and therefore Vol=TL× Ta×Tb.

Thus obtained set of conversion characteristic values (PL, Pa, Pb) represents a distortion degree to which the Lab uniform color space LabZ is distorted at the input color point (Li, ai, bi) with regards to the human visual perception.

Next, a detailed explanation of the processes performed in the step S3 for calculating the set of print control data (Pc, Pm, Py, Pk) 36 will be described below.

Because the processes in the step S2 already identify the lattice points A through H of the cube J including the input color point P, the color conversion portion 24 retrieves, from the color conversion values memory 34, eight sets of color conversion values (Ac', Am', Ay', Ak'), (Bc', Bm', By', Bk'), ..., (Hc', Hm', Hy', Hk') stored at the addresses of the lattice numbers of the eight lattice points Then, the color conversion portion 24 first reconverts the set of color conversion values (Ac', Am', Ay', Ak') for the lattice point A into a set of print control data (Ac, Am, Ay, Ak), by the following formulas (9):

$$Ak=Ak'$$

$$Ac=(Ac'/255)\times(255-Ak')+Ak' \quad (9)$$

$$Am=(Am'/255)\times(255-Ak')+Ak'$$

$$Ay=(Ay'/255)\times(255-Ak')+Ak'$$

The portion 24 reconverts each of the other seven sets of color conversion values (Bc', Bm', By', Bk'), ..., (Hc', Hm', Hy', Hk') into seven sets of print control values (Bc, Bm, By, Bk), ..., (Hc, Hm, Hy, Hk), by the same formulas (9).

Then, the portion 24 calculates a set of color print control data (Pc, Pm, Py, Pk) for the input color point P, by interpolating the thus obtained eight sets of values (Ac, Am, Ay, Ak), (Be, Bm, By, Bk), ..., (He, Hm, Hy, Hk) for the eight lattice points A–H, by the following formula (10):

$$Pc=VA\times Ac+VB\times Bc+VC\times Cc+VD\times Dc+VE\times Ec+VF\times Fc+VG\times Gc+VH\times Hc,$$

$$Pm=VA\times Am+VB\times Bm+VC\times Cm+VD\times Dm+VE\times Era+VF\times Fm+VG\times Gm+VH\times Hm, \quad (10)$$

$$Py=VA\times Ay+VB\times By+VC\times Cy+VD\times Dy+VE\times Ey+VE\times Fy+VG\times Gy+VH\times Hy,$$

$$Pk=VA\times Ak+VB\times Bk+VC\times Ck+VD\times Dk+VE\times Ek+VF\times Fk+VG\times VH+VH\times Hk,$$

wherein VA, VB, ... VH are weight coefficients determined for the lattice points A–H, respectively. The weight coefficients VA, VB, ... VH are calculated dependently on the set of color conversion characteristic values (PL, Pa, Pb) calculated for the input color point P in the step S2. That is, the weight coefficients VA–VH are calculated by the following formulas (11):

$$VA=\text{Cube } A/\text{Cube}$$

$$VB=\text{Cube } B/\text{Cube}$$

$$VC=\text{Cube } C/\text{Cube}$$

$$VD=\text{Cube } D/\text{Cube} \quad (11)$$

$$VE=\text{Cube } E/\text{Cube}$$

$$VF=\text{Cube } F/\text{Cube}$$

$$VG=\text{Cube } G/\text{Cube}$$

$$VH=\text{Cube } H/\text{Cube}$$

wherein:

$$\text{Cube } A=PL\times(TL-SL)\times Pa\times(Ta-Sa)\times Pb\times(Tb-Sb),$$

$$\text{Cube } B=PL\times(TL-SL)\times Pa\times(Ta-Sa)\times Sb,$$

$$\text{Cube } C=PL\times(TL-SL)\times Sa\times Pb\times(Tb-Sb),$$

$$\text{Cube } D=PL\times(TL-SL)\times Sa\times Sb,$$

$$\text{Cube } E=SL\times Pa\times(Ta-Sa)\times Pb\times(Tb-Sb),$$

$$\text{Cube } F=SL\times Pa\times(Ta-Sa)\times Sb,$$

$$\text{Cube } G=SL\times Sa\times Pb\times(Tb-Sb),$$

$$\text{Cube } H=SL\times Sa\times Sb,$$

$$\text{Cube}=\text{Cube } A+\text{Cube } B+\text{Cube } C+\text{Cube } D+\text{Cube } E+\text{Cube } F+\text{Cube } G+\text{Cube } H,$$

The eight weight coefficients VA, VB, ... VH are thus determined dependently on the set of color conversion characteristic values (PL, Pa, Pb) already determined in the color conversion characteristic calculation portion 22. Accordingly, the set of print control data (Pc, Pm, Py, Pk) can be calculated while correcting the distortion of the Lab uniform color space LabZ around the input color point (Li, ai, bi) with regards to the human visual perception.

The set of print control data (Pc, Pm, Py, Pk) thus calculated for the input color point P is then outputted to the print head control portion 36 of the printer 12 as a printer control signal. The printer 12 is controlled by the print control data (Pc, Pm, Py, Pk) to print out the desired color corresponding to the input data (Li, ai, bi) on the print medium 13.

As described above, according to the present embodiment, when determining the set of print control data for the input color point P, the set of color conversion characteristic values is first calculated. This set of color conversion characteristic values represents minute shifts in human visual perception of the uniform color space Lab. Then, the set of print control data for the color point P is calculated, by interpolating the eight sets of color conversion data predetermined for the eight lattice points surrounding the input color point P. At this stage, weight coefficients used for this interpolation process are determined or corrected by the obtained set of color conversion characteristic values, so that the minute shifts in human visual perception of the uniform color space is corrected. An image reproduced by this method has therefore colors that match the perception of the human eye.

The following is an explanation of the color conversion device 11 according to a second preferred embodiment of the present invention. The device of the present embodiment is also used in the total system as shown in FIG. 5, similarly to that of the first embodiment.

Figure 16:
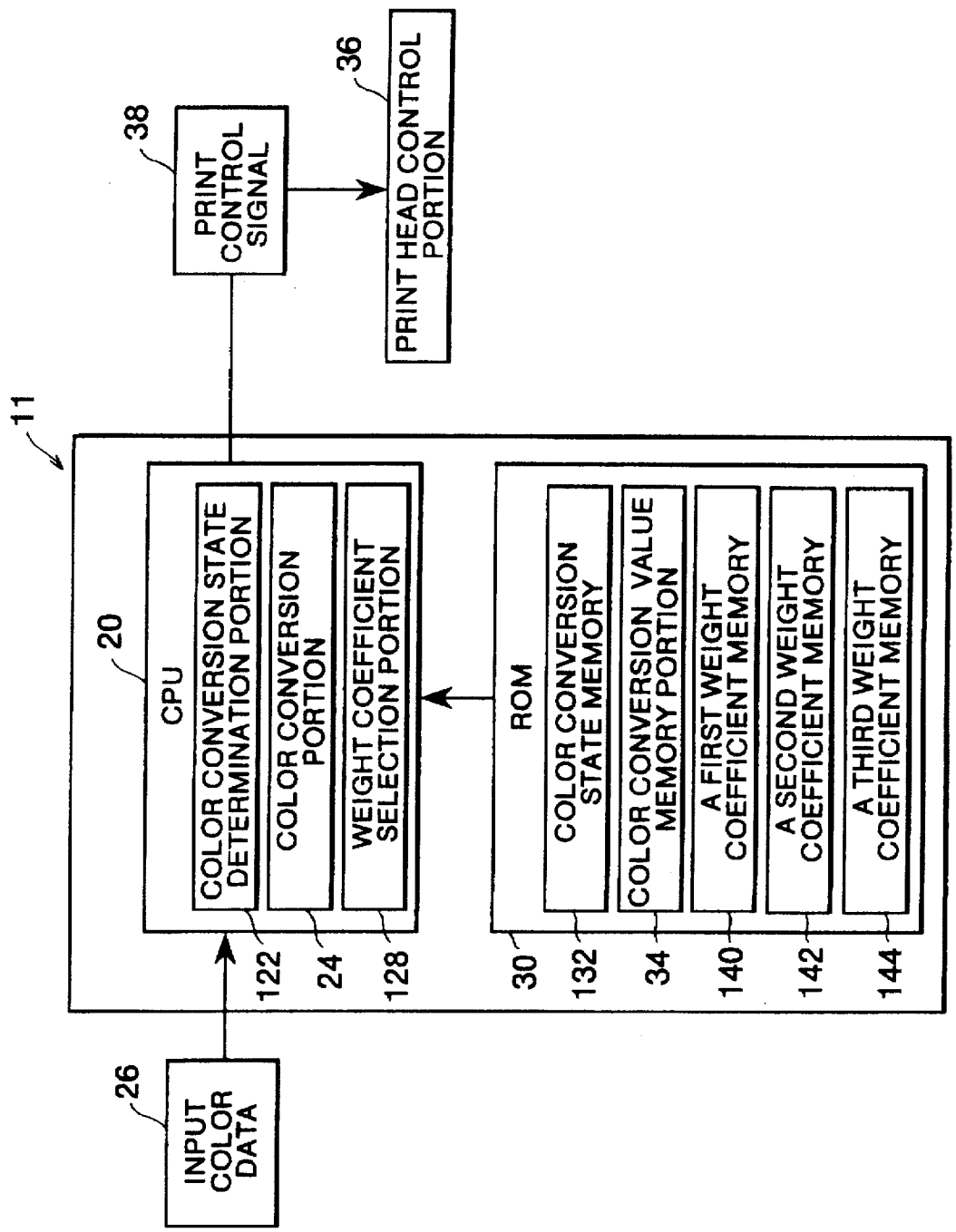
FIG. 16 is a block diagram of a color conversion device of a second embodiment of the present invention.

First, an explanation of the structure of the device 11 will be provided while referring to FIG. 16. The color conversion device 11 of the present embodiment mainly includes a CPU 20 and a ROM 30 electrically connected to each other. The CPU 20 includes a color conversion state determination portion 122, the color conversion portion 24, and a weight coefficient selection portion 128. The CPU 20 is connected to the input device 10, from which the set of input color data (Li, ai, bi) 26 is inputted to the CPU 20, and to the print head control portion 36 of the printer 12, to which the CPU 20 outputs the set of print control data (Ci, Mi, Yi, Ki) 38. The ROM 30 includes a color conversion state memory 132, the color conversion value memory 34, a first weight coefficient memory 140, a second weight coefficient memory 142 and a third weight coefficient memory 142.

The color conversion value memory 34 is the same as that of the first embodiment, and stores the sets of color conversion values (C', M', Y', K') as shown in FIG. 8 for the respective ones of all the lattice points in the Lab uniform color space LabZ.

Figures 17, 18:
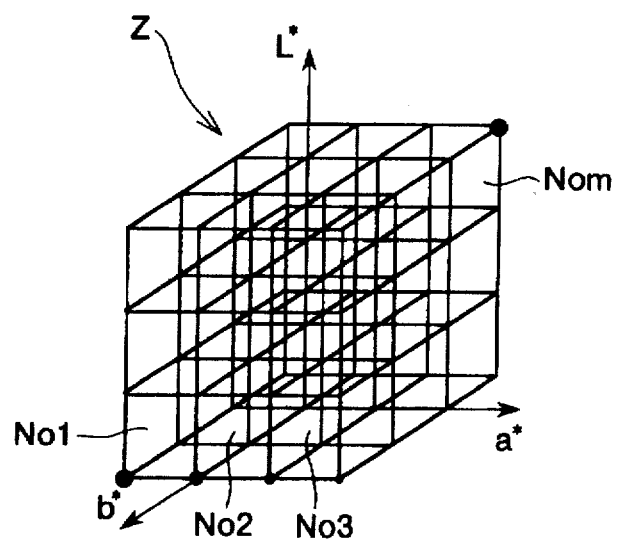
FIG. 17 illustrates a uniform color space divided into a plurality of cubes.
FIG. 18 shows the content of a color conversion state memory 132 of FIG. 16.

The color conversion state memory 132 will be described in greater detail while referring to FIGS. 17 and 18.

Also in the present embodiment, the Lab uniform color space LabZ is divided into many uniform cubes of optional size. Each cube has lengths or sizes of TL, Ta and Tb along the L, a, and b axial directions, respectively. According to the present embodiment, all the cubes that form the lattice space are allotted cube numbers: No. 1, No. 2, . . . No. m. The cube numbers correspond to addresses in the color conversion state memory 132, as shown in FIG. 18. A color conversion state value is previously determined for each cube, and stored in the color conversion characteristic memory 132.

The color conversion state value will be described in detail below.

It is noted that the degree to which the color space is distorted with regard to the human visual sense vary in accordance with the area of the color space. In some areas, the color space is not so distorted, but is almost uniform. In other words, each of the color conversion characteristic values L, a, b (refer to FIG. 9) obtained for the lattice points at these areas is equal to or close to one (1). In these areas, it is unnecessary to correct the color distortion. In other areas, however, the color space is extremely distorted. In other words, at least one of the color conversion characteristic values L, a, b (shown in FIG. 9) obtained for the lattice points at these areas is largely shifted from one (1). In these areas, it is necessary to correct the color distortion. Accordingly, in the present embodiment, input colors (Li, ai, bi) located in the cubes of the respective areas are converted in manners determined dependently on the color distortion states of the corresponding areas.

In addition, there may be the cases where specific colors located in some areas of the color space should be converted so that they appear closer to imaginary color states that people remember or conceive the colors to be than to their actual color states. For example, there is a case where a color of blue sky image should be converted into a color closer to a color of an ideally beautiful blue sky than to an actual blue sky. Similarly, there is another case where a color of tomato image should be converted into a color closer to a color of a more appetizing red tomato than to an actual red tomato. Accordingly, in the present embodiment, colors in the specific areas should be converted in specific manners which are different from those for converting the colors into actual colors.

For simplicity and clarity, the color conversion state value will be described below with referring to a concrete example where all the cubes constituting the color space LabZ are classified into three different types of cubes. In the areas defined by the first type of cubes, the color space is sufficiently uniform in regards to human visual sense, and no correction is necessary. More specifically, each of the color conversion characteristic values L, a, and b obtained for a lattice point A representative of each of the first types of cubes is close to 1.

In the areas defined by the second type of cubes, the color space is distorted in regards to the human visual sense to such a degree that correction is required. Now assume that in the second type of cubes, the color space is distorted by almost the same degree with each other. In this example, the distortion degree of each of the second types of cubes is approximated by the set of color conversion characteristic values (AL, Aa, Ab) obtained for the lattice point A of each of the second types of cubes. Now assume that the sets of color conversion characteristic values (AL, Aa, Ab) obtained for the lattice points A of the second types of cubes are close to a particular value set (AL', Aa', Ab'), with at least one of the particular values AL', Aa' and Ab' being apart from one (1). Accordingly, in this example, the distortion degree of each of the second types of cubes can be approximated by the particular value set (AL', Aa', Ab').

In the areas defined by the third type of cubes, colors located in the cubes should be converted into colors closer to human's imagined ideal colors than to their actual colors.

In this example, the first, second and third types of cubes are allotted the color conversion state values of one (1), two (2) and three (3), respectively. Accordingly, the memory 132 stores the color conversion state value for each cube, at an address of the corresponding cube number, as shown in FIG. 18.

According to the present embodiment, individual weight coefficient memories are provided in correspondence with the types of the cubes. In this concrete example, therefore, three (first, second and third) weight coefficient memories 140, 142 and 144 are provided in correspondence with the three (first, second and third) types of the cubes, respectively. The weight coefficients stored in the weight coefficient memories 140 through 144 are previously determined by different methods.

The weight coefficient memories 140-144 will be described below in detail.

Figure 19:
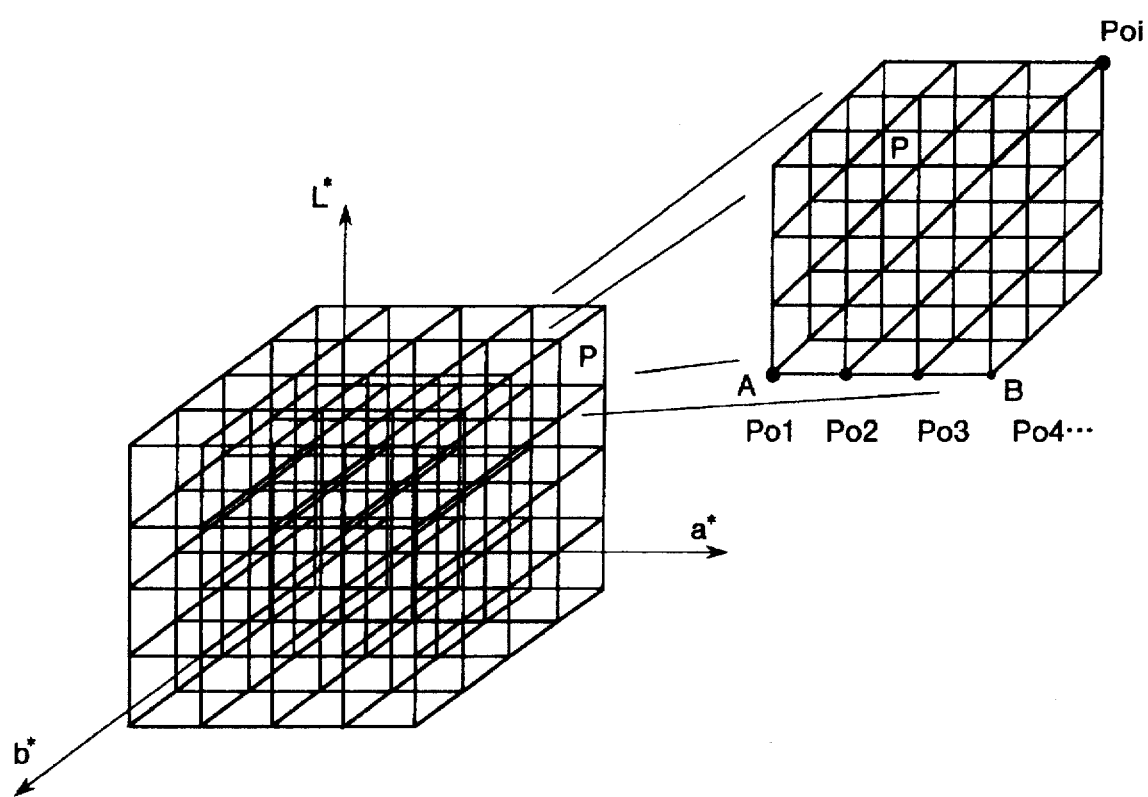
FIG. 19 illustrates that each of the plurality of cubes formed in the uniform color space is further divided into a plurality of sub-cubes.

According to the present embodiment, each cube is further divided into smaller cubes (referred to as "sub-cubes," hereinafter) by uniform intervals of optional length, as shown in FIG. 19. Now, assume that each cube is divided by the number of L count, a count, and b count along the L, a and b axial directions, respectively. Thus, the total number of the sub-cubes produced in each cube is the product i=L count×a count×b count. Each point of intersection (referred to as a "cube point," hereinafter) that represents the corresponding sub-cube is allotted a cube point number (Po 1, Po 2, ..., Po i). Each of the first through third weight coefficient memories 140–144 stores therein a set of eight weight coefficients (WA, WB, WC, ..., WH) for each of all the sub-cubes, at an address of the corresponding cube point number Po 1, Po 2, ..., Po i, as shown in FIG. 20.

The manner of determining a set of eight weight coefficients (WA, WB, WC, ..., WH) for each sub-cube of the first type of cube will be described below.

Because the first type of cubes do not need correction of color space distortion, the weight coefficients for the sub-cubes can be calculated in a general manner. More specifically, the set of eight weight coefficients (WA, WB, WH) for each sub-cube is calculated by the following formulas (12):

$$WA = (TL-SL) \times (Ta-Sa) \times (Tb-Sb)/Vol$$
$$WB = (TL-SL) \times (Ta-Sa) \times Sb/Vol$$
$$WC = (TL-SL) \times Sa \times (Tb-Sb)/Vol$$
$$WD = (TL-SL) \times Sa \times Sb/Vol$$
$$WE = SL \times (Ta-Sa) \times (Tb-Sb)/Vol \quad (12)$$
$$WF = SL \times (Ta-Sa) \times Sb/Vol$$
$$WG = SL \times Sa \times (Tb-Sb)/Vol$$
$$WH = SL \times Sa \times Sb/Vol$$

where, TL, Ta, Tb are the lengths of the cube along the L, a, and b axes, respectively;

SL, Sa, and SB are the color differences between the cube point representative of each sub-cube and the lattice point A of the cube along the L, a, and b axial directions, respectively; and Vol is the volume of the cube and therefore Vol=TL×Ta×Tb.

Thus, a set of first weight coefficients (WA, WB, WC, WD, WE, WF, WG, WH) is determined for each sub-cube, and is stored in the memory 140 at an address of the corresponding cube point number.

The manner of determining the set of eight weight coefficients (WA, WB, ..., WH) for each sub-cube in the second type of cube will be described below.

Because the set of color conversion characteristic values (AL', Aa', Ab') substantially represents the color distortion degree of the second type of cubes, the set of eight weight coefficients (WA, WB, WC, ..., WH) are calculated based on the values (AL', Aa', Ab') by the following formulas (13):

$$WA = \text{Cube } A/\text{Cube}$$
$$WB = \text{Cube } B/\text{Cube} \quad (13)$$
$$WC = \text{Cube } C/\text{Cube}$$
$$WD = \text{Cube } D/\text{Cube}$$
$$WE = \text{Cube } E/\text{Cube}$$
$$WF = \text{Cube } F/\text{Cube}$$
$$WG = \text{Cube } G/\text{Cube}$$
$$WH = \text{Cube } H/\text{Cube}$$

wherein:

Cube $A = AL' \times (TL-SL) \times Aa' \times (Ta-Sa) \times Ab' \times (TbSb)$, Cube $B = AL' \times (TL-SL) \times Aa' \times (Ta-Sa) \times Sb$, Cube $C = AL' \times (TL-SL) \times Sa \times Ab' \times (Tb-Sb)$, Cube $D = AL' \times (TL-SL) \times Sa \times Sb$, Cube $E = SL \times Aa' \times (Ta-Sa) \times Ab' \times (Tb-Sb)$, Cube $F = SL \times Aa' \times (Ta-Sa) \times Sb$, Cube $G = SL \times Sa \times Ab' \times (Tb-Sb)$, Cube $H = SL \times Sa \times Sb$, Cube = Cube $A$ + Cube $B$ + Cube $C$ + Cube $D$ + Cube $E$ + Cube $F$ + Cube $G$ + Cube $H$, where TL, Ta, Tb are the lengths of the cube along the L, a, and b axes, respectively; and SL, Sa, and SB are the color differences between the cube point representative of each sub-cube and the lattice point A of the cube along the L, a, and b axial directions, respectively.

Thus, a set of second weight coefficients (WA, WB, WC, WD, WE, WF, WG, WH) is determined for each sub-cube, and is stored in the memory 142 at an address of the corresponding cube point number.

The manner of determining the set of eight weight coefficients (WA, WB, ..., WH) for each sub-cube in the third type of cube will be described below.

Now assume that actual colors ($L_0$, $a_0$, $b_0$) located in the third type of cubes should be converted into ideal colors ($L_1$, $a_1$, $b_1$) which are determined by subjective evaluation.

The color differences between the actual colors and their ideal colors along the L, a, and b axial directions are calculated by the following formulas (14):

$$\Delta L = L_1 - L_0$$
$$\Delta a = a_1 - a_0 \quad (14)$$
$$\Delta b = b_1 - b_0$$

Then, the above-described formulas (12) are calculated, with the values SL, Sa and Sb therein being substituted by the following values SL', Sa' and Sb'.

$$SL' = P_o L + \Delta L - L_A$$
$$Sa' = P_o a + \Delta a - a_A \quad (15)$$
$$Sb' = P_o b + \Delta b - b_A$$

where ($L_A$, $a_A$, $b_A$) is a coordinate of the lattice point A of the cube; and ($P_0 L$, $P_0 a$, $P_0 b$) is a coordinate of the cube point of each sub-cube in the cube.

Thus, a set of third weight coefficients (WA, WB, WC, WD, WE, WF, WG, WH) is determined for each sub-cube, and is stored in the memory 144 at an address of the corresponding cube point number.

The color conversion device 11 of the present embodiment having the above-described structure operates, as will be described below.

Figure 21:
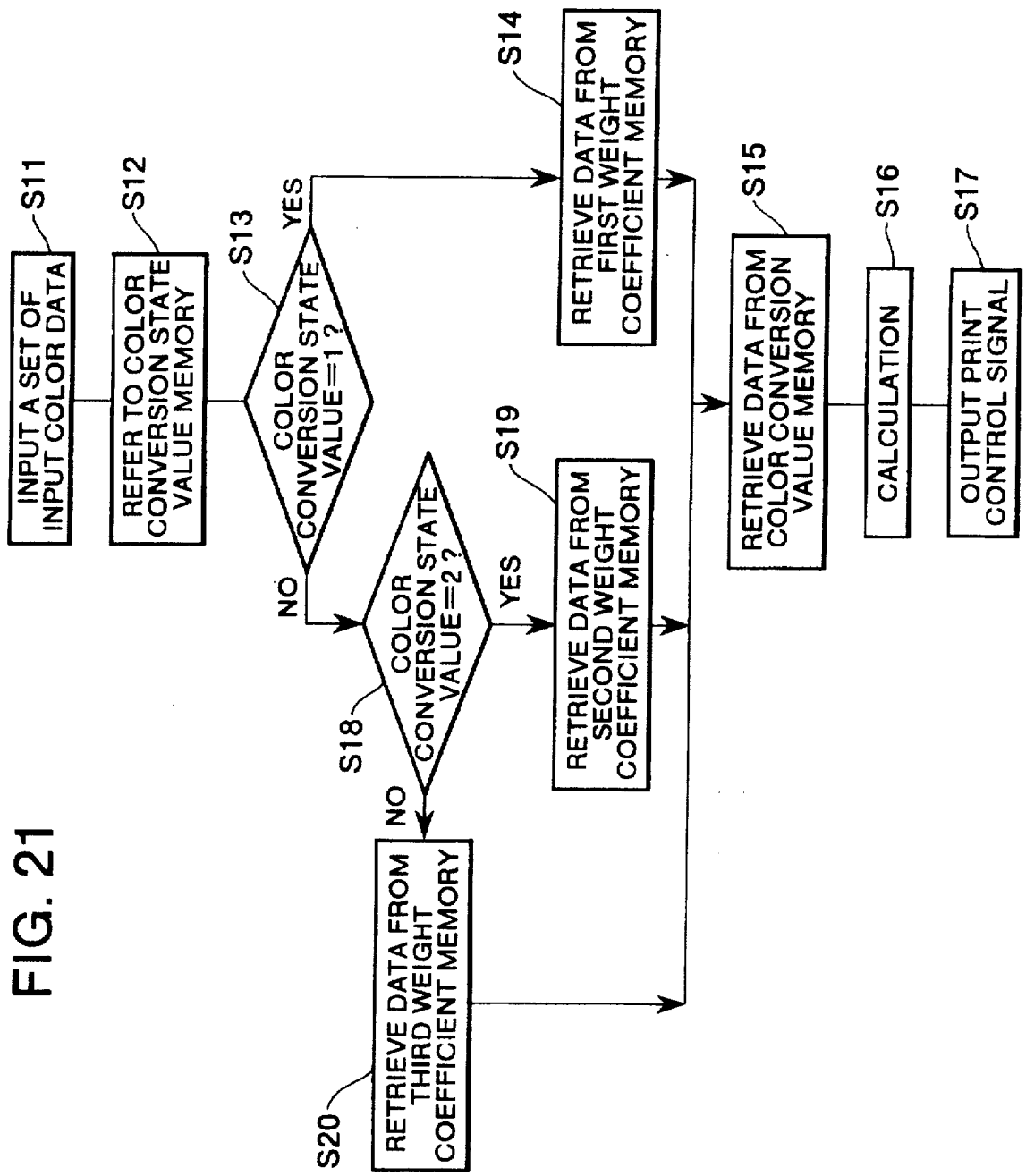
FIG. 21 is a flow chart illustrating the operation of the color conversion device of the second embodiment.

As shown in FIG. 21, a set of input color data (Li, ai, bi) 26 of a desired color is inputted to the CPU 20 from the input device 10, in step S11. The input color data set (Li, ai, bi) represents an input color point P located in the Lab uniform color space divided in a lattice defined as shown in FIG. 17. Then, the color conversion state determination portion 122 searches out a specific cube J in which the input color point P resides as shown in FIG. 14, by using the formula (6)

described in the first embodiment. Then, the color conversion state determination portion 122 refers to the color conversion state memory 132 to know the color conversion state value of the specific cube J in which the input color point P resides, in step S12.

Then, the weight coefficient selection portion 128 judges whether the color conversion state value of the specific cube J is 1 or not, in step S13. If the color conversion state value for the specific cube J is judged as "1", it is determined that the specific cube J is the first type of cube where the color space is almost uniform. Accordingly, it is determined that the set of print control data (Ci, Mi, Yi, Ki) for the input color P should be calculated by interpolating the eight sets of color conversion values for the eight lattice points A–H surrounding the particular cube J stored in the memory 34 with the use of the weight coefficients stored in the first weight coefficient memory 140.

The weight coefficient selection portion 128 further calculates the cube point number [address] of a cube point representative of a specific sub-cube in the particular cube J in which the input color point P resides as shown in FIG. 19, by the following formulas (16):

$$L \text{ address}=(int)(SL/TL \times L \text{ count})$$

$$a \text{ address}=(int)(Sa/Ta \times a \text{ count}) \quad (16)$$

$$b \text{ address}=(int)(Sb/Tb \times b \text{ count})$$

address=$L$ address×$a$ count×$b$ count+$a$ address ×$b$ count+$B$ address.

Then, a first set of eight weight coefficients (WA, WB, WC, WD, WE, WF, WG, WH) stored at the address of the calculated cube point number [address] is retrieved from the memory 140, in step S14.

Figure 14:
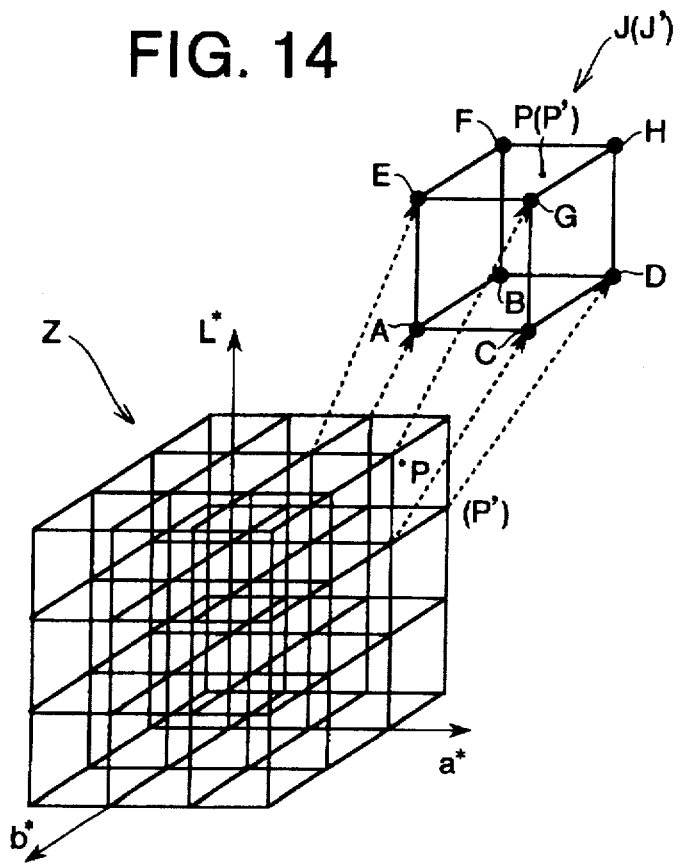
FIG. 14 illustrates the manner of determining a particular cube J in which an input color point P represented by the input color data is located in the uniform color space.

Then, in step S15, the color conversion portion 24 retrieves, from the color conversion value memory 34 (FIG. 8), the eight sets of color conversion values (Ac', Am', Ay', Ak'), (Bc', Bm', By', Bk'), . . . , (Hc', Hm', Hy', Hk') predetermined and stored for the eight lattice points A–H forming the particular cube J, as shown in FIG. 14.

The color conversion portion 24 then reconverts the eight sets of color conversion values (Ac', Am', Ay', Ak'), (Bc', Bm', By', Bk'), . . . , (Hc', Hm', Hy', Hk') into eight sets of print control data (Ac, Am, Ay, Ak), (Bc, Bm, By, Bk), . . . , (Hc, Hm, Hy, Hk), in the same manner as calculation by the formulas (9) described in the first embodiment.

Then, the color conversion portion 24 calculates a set of print control data (Pc, Pm, Py, Pk) for the input color point P in step S16, by interpolating the eight sets of print control data (Ac, Am, Ay, Ak) . . . (Hc, Hm, Hy, Hk) with the first set of eight weight coefficients (WA, WB, WC, WD, WE, WF, WG, WH) retrieved in the step S14 by the following formula (17):

$$Pc=WA \times Ac+WB \times Bc+WC \times Cc+WD \times Dc+WE \times Ec+WF \times Fc+WG \times Gc+WH \times Hc,$$

$$Pm=WA+WB \times Bm+WC \times Cm+WD \times Dm+WE \times Em+WF \times Fm+WG \times Gm+WH \times Sm, \quad (17)$$

$$Py=WA \times Ay+WB \times By+WC \times Cy+WD \times Dy+WE \times Ey+WF \times Fy+WG \times Gy+WH \times Hy,$$

$$Pk=WA \times Ak+WB \times Bk+WC \times Ck+WD \times Dk+WE \times Ek+WF \times Fk+WG \times Gk+WH \times Hk.$$

By this, the set of print control data (Pc, Pm, Py, Pk) for the input color data (Li, ai, bi) is calculated and then outputted to the print head control portion 36 of the printer 10 as a printer control signal 38 in step S17.

On the other hand, when the color conversion state value for the particular cube J is judged not to be "1" in step 13, the process proceeds to step S18 to judge whether the color conversion state value is "2" or not. If the color conversion state value is "2", a set of eight weight coefficients is retrieved, in step S19, from the second weight coefficient memory 142 at the address of the cube point number representative of the sub-cube in which the input color point P resides. Subsequent processes are the same as described previously.

When the color conversion state value is not "2" but is "3" in the step S18, on the other hand, a set of eight weight coefficients is retrieved, in step S20, from the third weight coefficient memory 144 at the address of the cube point number representative of the sub-cube in which the input color point P resides. Subsequent processes are the same as described previously.

As described above, the effect of the present embodiment can do more than merely improve minute shifts between an actual color in a uniform color space and the way a person perceives the color. According to the present embodiment, other color conversions can be performed at optional places in the color space. Specific colors can be converted so that they appear closer to the color people remember, or conceive, a color to be. For example, an image of a blue sky can have its colors converted so that the blue is closer to what is considered an ideally beautiful blue sky, or an image of a tomato can be color converted so its red color is more appetizing.

Thus, according to the present embodiment, an input color represented by the input color data (Li, ai, bi) can be converted into a print control data (Ci, Mi, Yi, Ki) representative of a color which has any desired color relationship with respect to the input color. In other words, desired color conversion can be performed to convert the input color data into a print control data in an optional location of a color space, and a good image can be reproduced.

Next, an explanation of a color conversion device according to a third preferred embodiment of the present invention will be provided below.

The color data conversion device of this embodiment is also for converting a set of input color data into a set of print control data for controlling a printing device. The color data conversion device includes: an input portion for inputting a set of input color data representative of a desired color defined in a three-dimensional uniform color space; a color data correction portion for correcting the input color data in a correction manner to produce a corrected set of input color data, the correction manner being determined dependently on a color distortion amount with which the three-dimensional uniform color space is distorted in regards to three attributes in human visual perception; a print control data conversion portion for converting the corrected set of input color data into a set of print control data capable of controlling a printing device to print out a color corresponding to the desired color on a print medium; and an output portion for outputting the set of print control data to the printing device so as to control the printing device by the print control data to print out the color corresponding to the desired color on the print medium.

The color data conversion device may further include: a colorimeter for measuring a color printed on the print medium to obtain a set of measured color data representative of the printed color; and a correction manner determining portion for determining the correction manner of the color data correction portion. The correction manner determining portion may include: an input controlling portion for controlling the input portion to input a plurality of sets of input sample color data representative of a plurality of sample colors defined in the three-dimensional uniform color space; a trial correction portion for controlling the color data correction portion to correct the plurality of input sample color data in a trial correction manner, the print control data conversion portion converting the plurality of corrected sets of input sample color data into a plurality of sets of print control data, the output portion outputting the plurality of sets of print control data to the printing device so as to control the printing device to print out the plurality of sample colors corresponding to the plurality of input sample colors; a colorimeter control portion for controlling the colorimeter to measure the plurality of sample colors printed on the print medium, to obtain a plurality of sets of measured sample color data representative of the printed sample colors; a color relationship calculation portion for calculating a color relationship between the plurality of sets of input sample color data and the plurality of sets of measured sample color data, in regards to the three attributes in the human visual perception; and a correction manner calculation portion for calculating the correction manner dependently on the calculated color relationship and the trial correction manner.

The three-dimensional uniform color space is preferably divided into a lattice to produce a plurality of lattice color points. The color relationship calculation portion may include: a color relationship data calculation portion for calculating a set of color relationship data indicative of color relationship between each of the plurality of sets of input sample color data and a corresponding one of the plurality of sets of measured sample color data, in regards to the three-dimensional uniform color space; a distortion amount memory portion for storing a plurality of sets of color distortion amount data for the plurality of lattice color points, each set of color distortion amount data indicating a distortion amount with which the three-dimensional uniform color space is distorted at the corresponding lattice color point in regards to the three attributes in the human visual perception; a color distortion data calculation portion for calculating a plurality of sets of color distortion data, each set of color distortion data being calculated based on a corresponding one of the plurality of input sample color data and several ones of the plurality of sets of color distortion amount data stored in the distortion amount memory portion, each set of color distortion data indicating a distortion amount in relation to the three attributes in the human visual perception with which the three-dimensional uniform color space is distorted at a corresponding input sample color point defined by the corresponding set of input sample color data; and a corrected color relationship calculating portion for calculating a set of corrected color relationship data indicative of a color relationship defined between each of the plurality of input sample color data and a corresponding one of the plurality of measured sample color data in regards to the three attributes in the human visual sense, each set of corrected color relationship data being calculated based on the color relationship data set calculated by the color relationship data calculating portion and the color distortion data set calculated by the color distortion data calculating portion for a corresponding one of the plurality of input sample color data and a corresponding one of the plurality of measured sample color data, wherein the correction manner calculation portion calculates the correction manner dependently on the plurality of sets of corrected color relationship data and the trial correction manner.

The color conversion device of the present embodiment will be described in greater detail, below.

Figure 22:
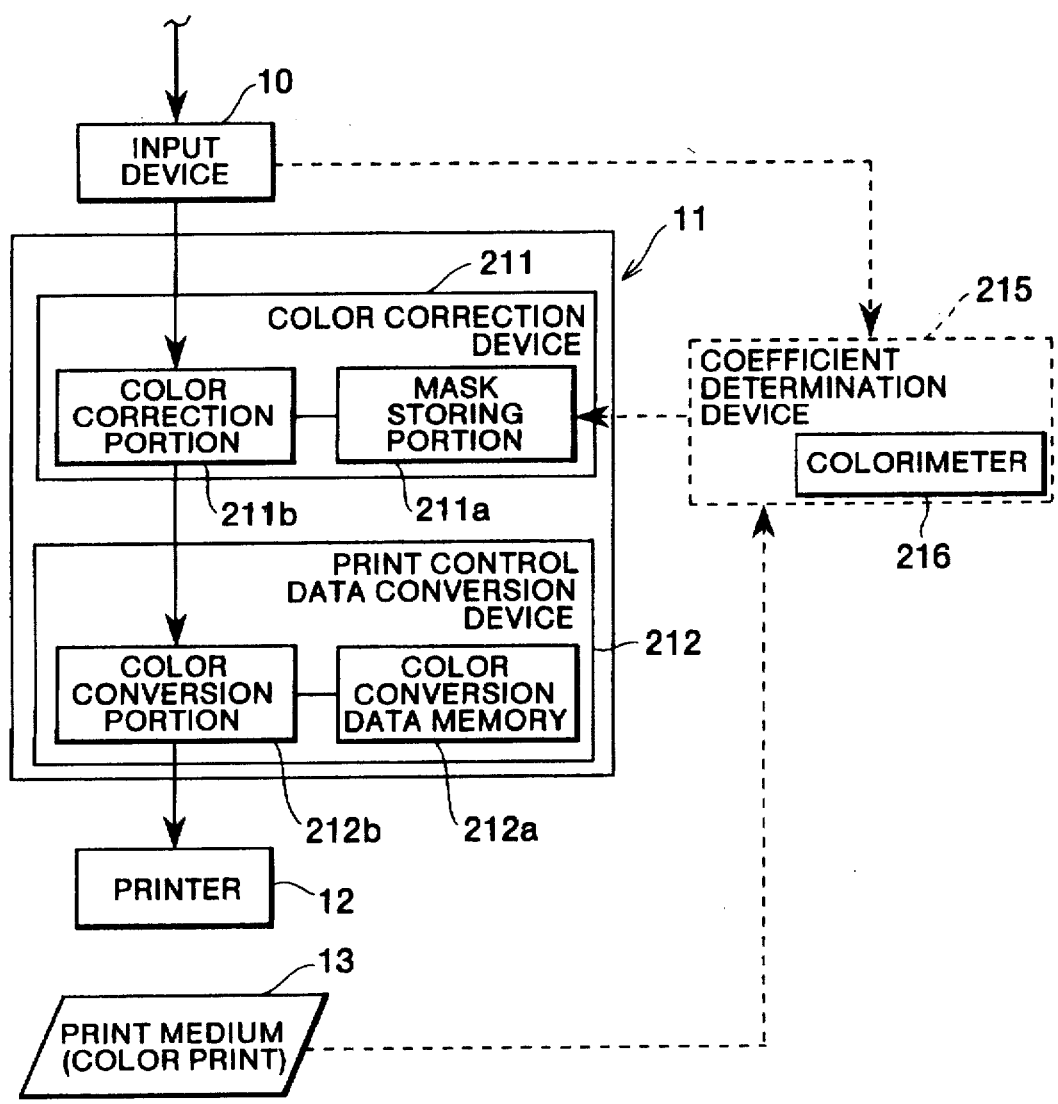
FIG. 22 is a block diagram showing that a color conversion device of a third embodiment of the present invention converts input color data into print control data and showing the manner how a coefficient determination device of the third embodiment is used to determine a correction coefficient matrix stored in a color correction device of the color conversion device.

The color conversion device 11 of this embodiment is arranged as shown in FIG. 22, similarly to that of the first and second embodiments of FIG. 5. That is, the color conversion device 11 of the present embodiment is also connected to the printer 12 and to an input device 10 which is in turn connected to an external source (not shown).

As shown in FIG. 22, according to the present embodiment, the color conversion device 11 is made up from a color correction device 211 and a print control data conversion device 212. The color correction device 211 is connected to the input device 10, and the print control data conversion device 212 is connected to the printer 12.

The input device 10 is for receiving, from the external device, a set of input color data (L*i, a*i, b*i) defined in the Lab uniform color space LabZ, similarly to the first and second embodiments.

The color correction device 211 includes a mask storing portion 211a for storing a mask M of color correction coefficients represented by the following formula (18):

$$M = \begin{pmatrix} M11 & M12 & M13 \\ M21 & M22 & M23 \\ M31 & M32 & M33 \end{pmatrix} \quad (18)$$

The color correction device 211 further includes a color correction portion 211b for receiving the set of input color data (L*i, a*i, b*i) from the input device 10 and for correcting the set of input color data (L*i, a*i, b*i) into a corrected set of input color data (L*i', a*i', b*i'), by the following masking operation (19):

$$\begin{pmatrix} L*i' \\ a*i' \\ b*i' \end{pmatrix} = \begin{pmatrix} M11 & M12 & M13 \\ M21 & M22 & M23 \\ M31 & M32 & M33 \end{pmatrix} \times \begin{pmatrix} L*i \\ a*i \\ b*i \end{pmatrix} \quad (19)$$

The color correction coefficient matrix M serves to correct the set of input color data (L*i, a*i, b*i) defined in the three-dimensional Lab uniform color space LabZ in accordance with the human visual sense.

The color correction device 211 further includes a calculation portion (not shown) for achieving calculation for previously determining the matrix M, as will be described later.

The print control data conversion device 212 includes a color conversion value memory 212a for storing the plurality of sets of color conversion values (C', M', Y', K') for the plurality of lattice points of the Lab color space LabZ. The color conversion value memory 212a is the same as that of the color conversion value memory 34 of the first and second embodiments. More specifically, the memory 212a stores the plurality of sets of color conversion values (C', M', Y', K') as shown in FIG. 8, at addresses of the lattice numbers representative of the respective ones of all the lattice points in the Lab uniform color space LabZ. The print control data conversion device 212 further includes a color conversion portion 212b for receiving the corrected set of input color data (L*i', a*i', b*i') from the color correction device 211 and for producing a set of print control data (Ci, Mi, Yi, Ki) for the corrected input color data (L*i', a*i', b*i') by reconverting the eight sets of color conversion values for the eight lattice points surrounding the corrected input color data point into eight sets of print control data and then interpolating the eight sets of print control data.

The printer 12 is for receiving the set of print control data (Ci, Mi, Yi, Ki) and for printing out a color corresponding to the input color (L*i, a*i, b*i) on a print medium 13.

The entire system of FIG. 22 including the color conversion device 11 operates as described below.

When a set of input color data (L*i, a*i, b*i) of a desired color is inputted from the external device to the input device 10, the input device 10 outputs the input color data to the color correction device 211. The color correction device 211 converts the input color data (L*i, a*i, b*i) into a corrected color data (L*i', a*i', b*i') by the above-described formula (19).

Also in the present embodiment, the Lab uniform color space LabZ is divided in a lattice. The corrected set of input color data (L*i', a*i', b*i') therefore represents a corrected input color point P' located at a position defined by the coordinates of L*i', a*i', and b*i'. Accordingly, the print control data conversion device 212 searches out a particular cube J' in which the corrected input color point P' resides, by using the formula (6) described in the first embodiment, as shown in FIG. 14.

As a result, the lattice points A through H surrounding the particular cube J' are identified. Accordingly, the color conversion portion 212b retrieves, from the memory 212a, eight sets of color conversion values (Ac', Am', Ay', Ak'), (Bc', Bm', By', Bk'), . . . , (Hc', Hm', Hy', Hk') stored at the addresses of the lattice numbers of the eight lattice points A, B, . . . , H.

Then, the color conversion portion 212b first reconverts the set of color conversion values (Ac', Am', Ay', Ak'), (Bc', Bm', By', Bk'), . . . , (Hc', Hm', Hy', Hk') into eight sets of print control data (Ac, Am, Ay, Ak), (Bc, Bm, By, Bk), . . . , (Hc, Hm, Hy, Hk), by the formulas (9) described in the first embodiment.

Then, the portion 212b calculates a set of color print control data (Pc, Pm, Py, Pk) for the corrected input color point P', by interpolating the eight sets of values (Ac, Am, Ay, Ak), (Bc, Bm, By, Bk), . . . , (Hc, Hm, Hy, Hk) for the eight lattice points A–H, by the following formula (20):

$$Pc=VA \times Ac+VB \times Bc+VC \times Cc+VD \times Dc+VE \times Ec+VF \times Fc+VG \times Gc+VH \times Hc,$$

$$Pm=VA \times Am+VB \times Bm+VC \times Cm+VD \times Dm+VE \times Em+VF \times Fm+VG \times Gm+VH \times Hm, \quad (20)$$

$$Py=VA \times Ay+VB \times By+VC \times Cy+VD \times Dy+VE \times Ey+VF \times Fy+VG \times Gy+VH \times Hy,$$

$$Pk=VA \times Ak+VB \times Bk+VC \times Ck+VD \times Dk+VE \times Ek+VF \times Fk+VG \times VH+VH \times Hk,$$

wherein VA, VB, . . . VH are weight coefficients determined for the lattice points A–H, respectively, and are calculated by the following formulas (21):

$$VA = \text{Cube } A/\text{Cube}$$
$$VB = \text{Cube } B/\text{Cube}$$
$$VC = \text{Cube } C/\text{Cube}$$
$$VD = \text{Cube } D/\text{Cube}$$
$$VE = \text{Cube } E/\text{Cube}$$
$$VF = \text{Cube } F/\text{Cube} \quad (21)$$
$$VG = \text{Cube } G/\text{Cube}$$
$$VH = \text{Cube } H/\text{Cube}$$

wherein:

$$\text{Cube } A=(TL-SL) \times (Ta-Sa) \times (Tb-Sb),$$
$$\text{Cube } B=(TL-SL) \times (Ta-Sa) \times Sb,$$
$$\text{Cube } C=(TL-SL) \times Sa \times (Tb-Sb),$$
$$\text{Cube } D=(TL-SL) \times Sa \times Sb,$$
$$\text{Cube } E=SL \times (Ta-Sa) \times (Tb-Sb),$$
$$\text{Cube } F=SL \times (Ta-Sa) \times Sb,$$
$$\text{Cube } G=SL \times Sa \times (Tb-Sb),$$
$$\text{Cube } H=SL \times Sa \times Sb,$$
$$\text{Cube}=\text{Cube } A+\text{Cube } B+\text{Cube } C+\text{Cube } D+\text{Cube } E+\text{Cube } F+\text{Cube } G+\text{Cube } H,$$

wherein TL, Ta, Tb are the lengths of the cube J' along the L, a, and b axes, respectively, and therefore are equal to the Lstep, astep and bstep of the lattice intervals;

SL, Sa, and SB are the color differences between the corrected input color point (Li', ai', bi') and the lattice point A ($L_A$, $a_A$, $b_A$) along the L, a, and b axis directions, respectively, and therefore SL=Li'-$L_A$, Sa=ai'-$a_A$, and Sb=bi'-$b_A$.

Thus, the print control data conversion device 212 converts the corrected color data (L*i', a*i', b*i') into the set of print control data (Pc, Pm, Py, Pk), based on which the printer 12 is driven to print the desired color corresponding to the input color data (L*i, a*i, b*i).

The color correction coefficient matrix M is previously obtained with the use of a coefficient determination device 215. That is, in order to obtain the matrix M, the coefficient determination device 215 is connected to both the input device 10 and the color correction device 211, as indicated by a dotted line of FIG. 22. More specifically, the entire system of FIG. 22 together with the coefficient determination device 215 operate to determine the matrix M of color correction coefficients so that the matrix M can properly omit distortions between actual colors and how they are perceived by the human eye.

The entire system shown in FIG. 22 together with the coefficient determination device 215 operate to determine the color correction coefficient matrix M, by achieving an experimentation as described below.

First, the color correction device 211 tentatively stores a first trial color correction coefficient matrix M1 in the memory 212a. Then, a plurality of sets of input sample color data (L*i, a*i, b*i) for a plurality of sample colors are inputted from the input device 10 to the color correction device 211. The color correction device 211 corrects the plurality of sets of input sample color data with the first trial color correction coefficient matrix M1. The print control data conversion device 212 then calculates the sets of print control data (Ci, Mi, Yi, Ki) based on the corrected sets of input color data, in the manner as described above. The printer 12 is driven to print the plurality of sample colors on the print medium 13. A colorimeter 216 provided in the coefficient determination device 215 measures the plurality of sample colors on the print medium 13 and outputs a set of measured sample color data (L*o, a*o, b*o) defined in the Lab uniform color space LabZ for each of the plurality of sample colors printed on the print medium 13.

It is preferable that the color correction coefficient matrix M in the color correction device 211 corrects the input sample color data (L*i, a*i, b*i) so that the measured sample color data (L*o, a*o, b*o) may be the same as or close to the input sample color data (L*i, a*i, b*i), in view of human visual sense. The device 215 therefore calculates the differences E(M=M1) between the input sample color data (L*i, a*i, b*i) and the measured sample color data (L*o, a*o, b*o) for all the sample colors, in view of human visual sense.

Then, the device 215 inputs the differences E(M=M1) to the color correction device 211. The calculation portion (not shown) in the device 211 calculates a sum $\Sigma E^2$(M=M1) of the squares of the differences E for all the sample colors. The sum $\Sigma E^2$(M=M1) therefore indicates the degree how the measured printed sample colors are totally shifted from the input sample colors when the first trial coefficient M1 is used.

Then, the first trial color correction coefficient matrix M1 is changed to a second trial coefficient matrix M2, and the same experimentation as described above is performed to obtain the second sum $\Sigma E^2$(M=M2). Repeatedly performing the same experimentation while changing the trial coefficient matrix Mn (n=1, 2, . . . ) can obtain a plurality of sums $\Sigma E^2$(M=Mn; n=1, 2, . . . ). The trial coefficient matrix Mn used when the smallest value of the plurality of sums $\Sigma E^2$ is obtained is judged as the most suitable matrix which can correct the input color data properly in view of human visual sense. Accordingly, this trial coefficient matrix Mn is stored in the matrix memory 211a of the color correction device 211 as the correction coefficient matrix M.

Figure 23:
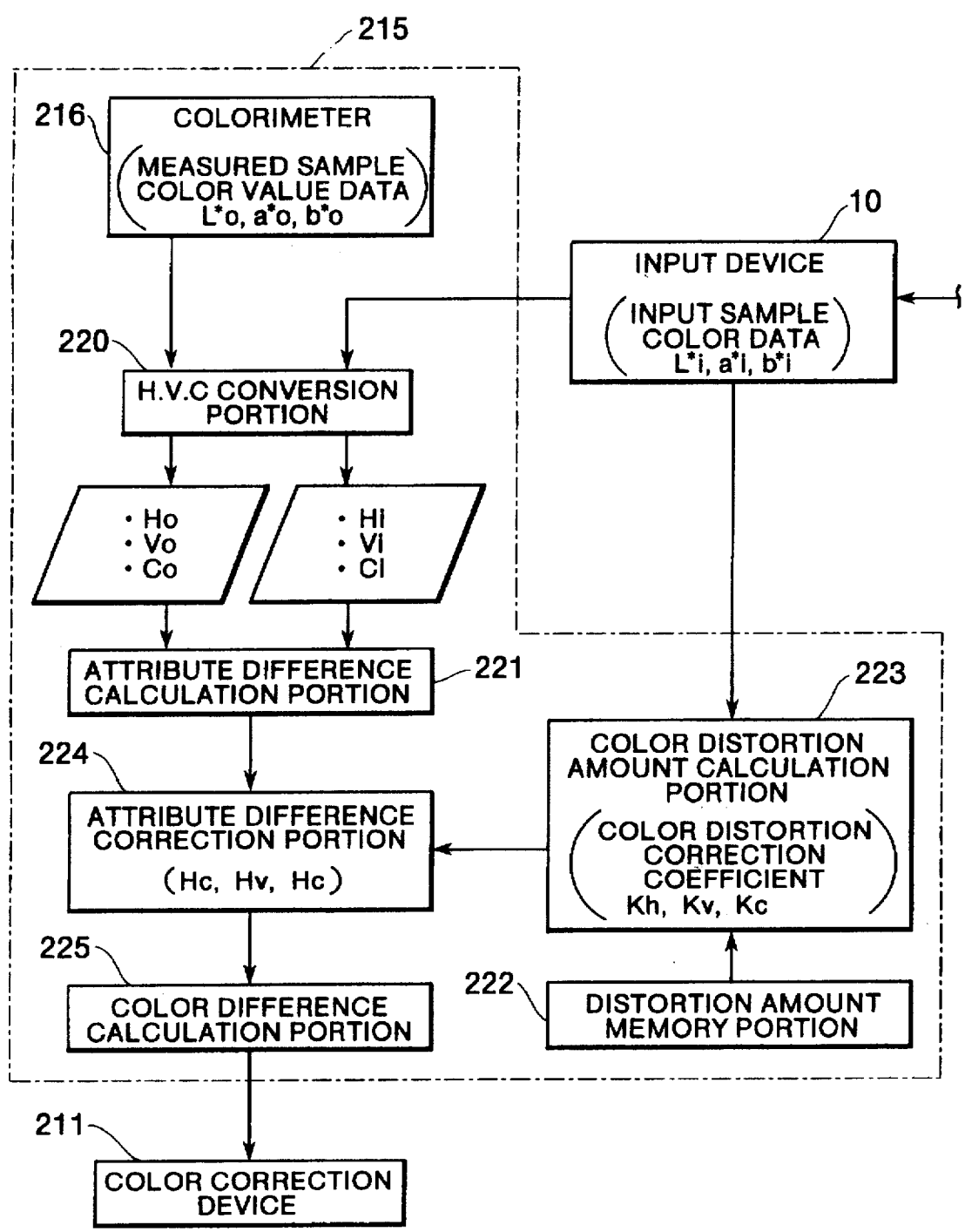
FIG. 23 is a block diagram of the coefficient determination device of the third embodiment.

The structure of the coefficient determination device 215 will be described below in more detail, with referring to FIG. 23.

The coefficient determination device 215 is made from a microcomputer provided with a CPU, a ROM, and the like; and the colorimeter 216. The CPU in the microcomputer constitutes: a HVC conversion portion 220, an attribute difference calculation portion 221, a color distortion amount calculation portion 223, a corrected attribute difference calculation portion 224, and a color difference calculation portion 225. The ROM in the microcomputer constitutes a distortion amount memory portion 222.

The coefficient determination device 215 is connected to both the input device 10 and the color correction device 211. More specifically, the input device 10 is connected to both the HVC conversion portion 220 and the color distortion amount calculation portion 223 so as to supply them with the set of input sample color data (L*i, a*i, b*i) outputted to the color correction device 211. The color correction device 211 is connected to the color difference calculation portion 225 to receive the color difference data E therefrom.

The colorimeter 216 is for measuring each sample color on a printed color sample image and for outputting, to the HVC conversion portion 220, a set of measured sample color data (L*o, a*o, b*o) defined in the Lab uniform color space LabZ.

The HVC conversion portion 220 is for receiving the set of measured sample color data (L*o, a*o, b*o) measured at the colorimeter 216 and for receiving the set of input sample color data (L*i, a*i, b*i) inputted from the input device 10. The portion 220 is for converting a received set of color data (L*, a*, b*) defined in the Lab color space LabZ into a set of three attribute data (H, V, C) where H, V and C represent a hue data, a lightness data, and a chroma data of the received set of color data (L*, a*, b*). In other words, the portion 220 performs the following calculation (22) for the received set of color data.

$$H=a \tan (b^*/a^*)$$

$$V=L^*/10 \quad (22)$$

$$C=\{(a^{*2}+b^{*2})\}^{1/2}$$

Accordingly, the portion 220 converts the set of measured sample color data (L*o, a*o, b*o) into a set of three attribute data (Ho, Vo, Co) of the measured sample color, and converts the set of input sample color data (L*i, a*i, b*i) into a set of three attribute data (Hi, Vi, Ci) of the input sample color.

The attribute difference calculation portion 221 is for receiving both the sets of three attribute data (Ho, Vo, Co) and (Hi, Vi, Ci) and for calculating a set of attribute difference data ($\Delta$H, $\Delta$V, $\Delta$C) by the following formula (23):

$$\Delta H = Hi - Ho$$

$$\Delta V = Vi - Vo \quad (23)$$

$$\Delta Ci - Co$$

where $\Delta$H, $\Delta$V, and $\Delta$C respectively represent a color hue difference, a lightness difference, and a chroma difference between the inputted sample color and the measured printed sample color.

As shown in FIG. 24, the distortion amount memory 222 stores a plurality of sets of color distortion data (h, v, c) on human perception of the three attributes (hue, lightness and chroma) for all the lattice points A through H of each of all the cubes defined in the Lab uniform color space LabZ (refer to FIG. 14). The set of color distortion data (h, v, c) is previously determined for each lattice point to represent a degree by which the color space around the lattice point is distorted. The color distortion data is defined, for example, by a deviation curve of a Munsell colorimetric system or ellipses of the MacAdam's system. The plurality of sets of color distortion data (h, v, c) are therefore used for correcting color distortions in the LabZ color space.

The sets of color distortion data (h, v, c) may be previously determined based on experimentation. For example, the sets of color distortion data (h, v, c) are obtained through converting the sets of color conversion characteristic values (L, a, b) of FIG. 9 which are determined through experimentation in the first embodiment for all the lattice points, as shown below:

$$h=a \tan(b/a)$$

$$v=L/10 \quad (24)$$

$$c=\{(a^2+b^2)\}^{1/2}$$

The color distortion amount calculation portion 223 is for receiving the set of input sample color data (L*i, a*i, b*i). The portion 223 is also for calculating a set of color distortion correction coefficients (Kh, Kv, Kc) for the set of input sample color data (L*i, a*i, b*i), where Kh, Kv and Kc represent a hue distortion correction coefficient, a lightness distortion correction coefficient, and a chroma distortion correction coefficient for the sample color, respectively. The portion 223 calculates the set of coefficient (Kh, Kv, Kc) by interpolating eight sets of color distortion data (h, v, c) which are stored in the memory 222 for eight lattice points of a particular cube J in which the input sample color point P defined by the data (L*i, a*i, b*i) resides, as shown in FIG. 14.

The attribute difference correction portion 224 is for correcting the attribute difference data $\Delta$H, $\Delta$V and $\Delta$C inputted from the attribute difference calculation portion 221 into corrected attribute difference data Hc, Vc, and Cc, by the following formula (25) based on the set of color distortion correction coefficients (Kh, Kv, Kc) inputted from the color distortion amount calculation portion 223.

$$Hc = \Delta H \times Kh,$$

$$Vc = \Delta V \times Kv, \quad (25)$$

$$Cc = \Delta C \times Kc.$$

Accordingly, the portion 224 can properly calculate differences between the measured sample color data (L*o, a*o, b*o) and the input sample color data (L*i, a*i, b*i) defined at the three attributes in view of the human visual sense. That is, the obtained corrected attribute differences Hc, Vc and Cc represent the difference, while correcting the shift between an actual color and the corresponding color as perceived by the human eye.

The color difference calculation portion 225 is for calculating a color difference data E between the measured sample color data (L*o, a*o, b*o) and the input sample color data (L*i, a*i, b*i), based on the corrected attribute differences Hc, Vc and Cc produced in the attribute difference correction portion 224. That is, the portion 225 calculates the following formula (26):

$$E = \{(Cc \times \sin Hc)^2 + Vc^2 + Cc^2\}^{1/2} \quad (26)$$

The portion 225 is also for outputting the calculated color difference data E to the color correction device 11.

The entire system of FIG. 22 together with the coefficient determination device 215 having the above-described structure operates to determine the correction coefficient matrix M which can properly compensate for shifts in human perception of the Lab uniform color space LabZ, as will be described below while referring to FIGS. 23 through 25.

First, the color correction device 211 tentatively sets a first trial matrix of color correction coefficients M1. Then, the external device supplies the input device 10 with a plurality of sets of input sample color data (L*i, a*i, b*i) representative of a plurality of sample colors. The input device 10 outputs the plurality of sets of input color data (L*i, a*i, b*i) to the color correction device 211. The device 211 calculates the following formula (27) for each of the plurality of sets of input sample color data (L*i, a*i, b*i):

$$\begin{pmatrix} L*i' \\ a*i' \\ b*i' \end{pmatrix} = M1 \times \begin{pmatrix} L*i \\ a*i \\ b*i \end{pmatrix} \quad (27)$$

Then, the print control data conversion device 212 converts each set of the plurality of sets of corrected input sample color data (L*i', a*i', b*i') into a set of print control data (Pc, Pm, Py, Pk) in the manner as described already using the formulas (6), (9), (20) and (21).

The printer 12 is driven by the set of print control data (Pc, Pm, Py, Pk) to print a sample color corresponding to each of the plurality of sets of input sample color data (L*i, a*i, b*i) on print medium 13.

Then, the colorimeter 216 measures each of the plurality of sample colors on the print medium 13 to output a set of measured sample color data (L*o, a*o, b*o).

Then, the HVC conversion portion 220 receives the set of input color data (L*i, a*i, b*i) and the set of measured color data (L*o, a*o, b*o) for each of the plurality of sample colors from the input device 10 and the colorimeter 216.

The HVC conversion portion 220 then converts the set of input color data (L*i, a*i, b*i) into a set of input attribute data (Hi, Vi, Ci) and converts the set of measured color data (L*o, a*o, b*o) into a set of measured attribute data (Ho, Vo, Co) by the above-described formula (22). The set of input attribute data (Hi, Vi, Ci) and the set of measured attribute data (Ho, Vo, Co) represent three attributes of the input color data and the measured color data, respectively.

Then, the attribute difference calculation portion 221 calculates a set of attribute difference data (ΔH, ΔC) representing a difference between each attribute of the inputted attribute data (Hi, Hi, Ci) and each attribute of the measured attribute data (Ho, Vo, Co), by the above-described formula (23).

The color distortion amount calculation portion 23 determines the specific cube J where a sample color point P defined by the set of input sample color data (L*i, a*i, b*i) of each sample color resides as shown in FIG. 14, by the above-described formula (6). As a result, the eight lattice points A, B, C, D, E, F, G, and H of the cube J are identified.

Then, the portion 223 retrieves, from the distortion amount memory 222, the eight sets of color distortion amount data (Ah, Av, Ac), (Bh, By, Bc), (Ch, Cv, Cc), ... (Hh, Hv, Hc) which are stored at addresses of the lattice points A–H of the specific cube J.

Figure 25:
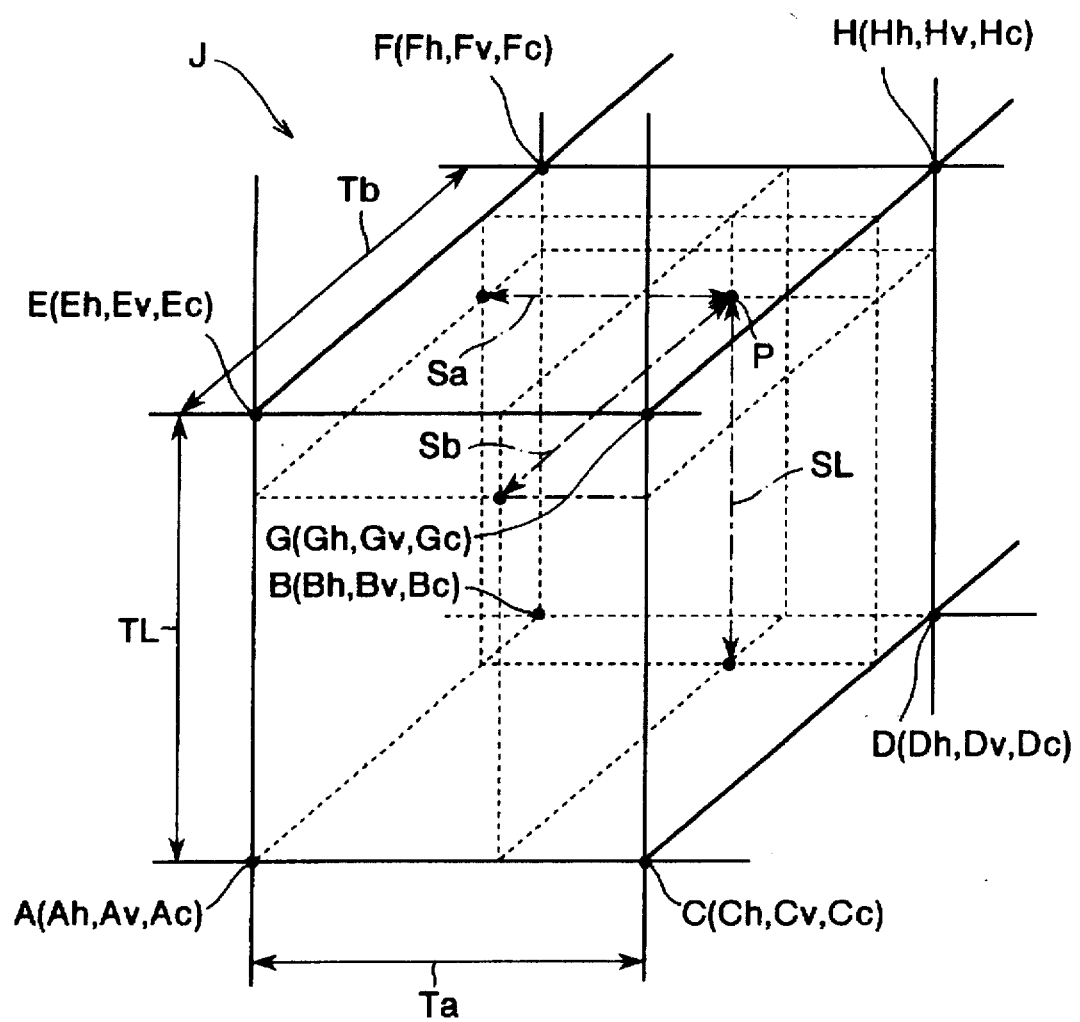
FIG. 25 illustrates the manner of calculating a set of color distortion correction coefficients (Kh, Kv, Kc) for the input sample color point P, based on the eight sets of color distortion amount data (Ah, Av, Ac), (Bh, By, Bc), . . . and (Hh, Hv, Hc).

Next, the color distortion amount calculation portion 223 calculates a set of color distortion correction coefficients (Kh, Kv, Kc) for the sample color P, as shown in FIG. 25. That is, this calculation is achieved by interpolating the retrieved eight sets of color distortion amount data (Ah, Av, Ac), (Bh, By, Bc), (Ch, Cv, Cc), ... (Hh, Hv, Hc) for the eight lattice points (A, B, ... H) of the cube J as follows:

$$Kh = Wa \times Ah + Wb \times Bh + Wc \times Ch + Wd \times Dh + We \times Eh + Wf \times Fh + Wg \times Gh + Wh \times Hh$$

$$Kv = Wa \times Av + Wb \times Bv + Wc \times Cv + Wd \times Dv + We \times Ev + Wf \times Fv + Wg \times Gv + Wh \times Hv$$

$$Kc = Wa \times Ac + Wb \times Bc + Wc \times Cc + Wd \times Dc + We \times Ec + Wf \times Fc + Wg \times Gc + Wh \times Hc \quad (28)$$

wherein Wa, Wb, ... Wh are weight coefficients for the lattice points A through H, respectively.

The weight coefficients for the lattice points A through H are calculated based on the following formula number (29):

$$Wa = (TL - SL) \times (Ta - Sa) \times (Tb - Sb)/Vol;$$

$$Wb = (TL - SL) \times (Ta - Sa) \times Sb/Vol; \quad (29)$$

$$Wc = (TL - SL) \times Sa \times (Tb - Sb)/Vol;$$

$$Wd = (TL - SL) \times Sa \times Sb/Vol;$$

$$We = SL \times (Ta - Sa) \times (Tb - Sb)/Vol;$$

$$Wf = SL \times (Ta - Sa) \times Sb/Vol;$$

$$Wg = SL \times Sa \times (Tb - Sb)/Vol; \text{ and}$$

$$Wh = SL \times Sa \times Sb/Vol;$$

Vol equals $TL \times Ta \times Tb$.

where TL, Ta and Tb are the lengths of the cube J along the L, a and b axial directions, and SL, Sa, and Sb are distances between the sample color point P and the lattice point A along the L, a and b axial directions.

The attribute difference correction portion 224 then calculates the set of corrected attribute difference data (Hc, Vc, Cc) for the sample color by the above-described formula (25). This set of corrected attribute difference data (Hc, Vc, Cc) properly represents the attribute difference between the input sample color and the measured printed sample color in view of the human perception.

Then, the color difference calculation portion 225 calculates a color difference data E representative of the color difference between the input sample color and the measured printed sample color for each sample color by the above-described formula (26). The color difference data E thus determined for each sample color is outputted to the color correction device 211.

The calculation portion in the color correction device 211 squares the difference data E for each sample color and then adds the results of all the sample colors to obtain a sum value $\Sigma E^2$. The sum value $\Sigma E^2$ therefore indicates the degree how the outputted sample colors are totally shifted from the inputted sample colors when the first trial coefficient M1 is used. Now, the sum value $\Sigma E^2$ is referred to as $\Sigma E^2(M=M1)$. In other words, this sum represents how effectively the corresponding trial coefficient matrix M1 has corrected the input sample color data in view of the human visual sense.

Then, the color correction device 211 changes the color correction coefficient matrix M from the first trial matrix M1 to another second trial matrix M2. Then, the input device 10 again inputs the plurality of sets of input sample color data (L*i, a*i, b*i) to the color correction device 211, and the plural sets of input sample color data are corrected by the second trial matrix M2. Then, the plurality of sets of corrected input sample color data are converted into the plurality of sets of print control data (Ci, Mi, Yi, Ki), and printing operation is performed at the printer 12. As a result, all the sample colors are printed on the medium 13. Then, the sample colors are measured at the colorimeter 216 to output the plurality of sets of measured sample color data (L*o, a*o, b*o). Then, the device 215 again performs the above-described processes to obtain the color difference data E for each sample color. Then, the color correction device 211 again calculates the sum value $\Sigma E^2(M=M2)$ for all the sample colors.

The above-described processes are performed repeatedly, while changing the trial matrix M into various values. As a result, a plurality of sums $\Sigma E^2(M=Mn; n=1, 2 \ldots )$ are obtained in correspondence with the used trial matrix Mn; n–1, 2, . . . Then, the calculation portion in the color correction device 211 compares the sum values $\Sigma E^2(M=Mn; n-1, 2, \ldots )$ obtained at all the trials. The trial matrix Mn used in the trial that produces the smallest sum value $\Sigma E^2$ is judged as the most suitable matrix which can properly correct the input color data in view of human visual sense. Accordingly, this trial coefficient matrix M is stored in the matrix memory 211a of the color correction device 211, as the color correction coefficient matrix M.

As described above, the set of color distortion correction coefficients (Kh, Kv, Kc) for the three attributes of color (hue, lightness, and chroma) for the set of input sample color data (L*i, a*i, b*i) is determined by using the color distortion amount data (h, v, c) of the color space on human perception of the three attributes. Then, the correction coefficient matrix M is determined dependently on both the difference between the input sample color data (L*i, a*i, b*i) and the measured sample color data (L*o, a*o, b*o) and the thus obtained set of color distortion correction coefficients (Kh, Kv, Kc). Therefore, distortions which will be possibly generated in the print control data in the uniform color space LabZ can be corrected in regards to human visual sense and therefore the three attributes of all colors can be corrected to become very near human perception.

While the invention has been described in detail with reference to specific embodiments thereof, it would be apparent to those skilled in the art that various changes and modifications may be made therein without departing from the spirit of the invention, the scope of which is defined by the attached claims.

For example, the present invention can be applied for converting the set of input color data defined in various uniform color spaces, such as CIELuv color spaces, other than the CIELab color spaces used in the embodiments.

The color conversion characteristic values L, a, b in the first embodiment stored in the memory 32 shown in FIG. 9 representative of the distortion degree of the uniform color space can be defined by various manners other than the formula (5). The conversion characteristic values L, a, b can be obtained through various methods of experimentation other than the method shown in FIGS. 10 through 12. For example, in order to obtain the first sample color and the second sample color shown in FIG. 12, more than 4,913 sample colors may be produced by preparing more than 4,913 sets of print control data (C, M, Y, K).

The conversion characteristic values L, a, b may also be defined by the following experimentation: A plurality of input sample colors (Li, ai, bi) are repeatedly inputted to the input device 10 while adjusting the color conversion characteristic values L, a, and b into various values, to thereby control the printer 12 to repeatedly print out the plurality of sample colors. Thus obtained printed sample colors and the input sample colors are observed by an observer. The color conversion characteristics L, a, and b used to print out a sample color completely the same as the input sample color in regards to the human visual sense are then stored in the memory 32.

The conversion characteristic values L, a, b can be calculated based on the MacAdam's color differentiation ellipses or based on the Munsell notation system.

The distortion amount data (h, v, c) stored in the memory 232 can be obtained through various manners, similarly as the conversion characteristic values (L, a, b).

In the second embodiment, the second type of cubes are assumed to be distorted by almost the same degree (AL', Aa', Ab'). Accordingly, a single memory 142 is provided for the second type of cubes. However, if the second type of cubes include several kinds of cubes which are distorted by different degrees, several memories have to be provided for the respective kinds of the second type of cubes. For example, if all the cubes are distorted by different degrees, individual memories have to be provided for all the cubes, respectively.

In the example described in the second embodiment, the distortion degree of each of the second types of cubes is approximated by the set of color conversion characteristic values (AL, Aa, Ab) obtained for the lattice point A of each of the second types of cubes. However, the distortion degree of the second types of cubes can be defined by other various manners. For example, mean values for the eight sets of color conversion characteristic values (AL, Aa, Ab), (BL, Ba, Bb), . . . , and (HL, Ha, Hb) of the eight lattice points of the respective cubes may be used to represent the distortion degree of the second types of cubes.

Although color conversion in the above-described embodiments for producing a set of print control data is based on a direct map method, color conversion of the present invention is not limited to the direct map method, and can be performed using various methods including masking method. More specifically, the print control data (Pc, Pm, Py, Pk) for the input color data (Li, ai, bi) can be obtained by the following formula:

$$\begin{pmatrix} Pc \\ Pm \\ Py \\ Pk \end{pmatrix} = K \cdot \begin{pmatrix} Li \\ ai \\ bi \end{pmatrix}$$

where $$K = \begin{pmatrix} KcL & Kca & Kcb \\ KmL & Kma & Kmb \\ KyL & Kya & Kyb \end{pmatrix}$$

In this case, the coefficients KcL, Kca, . . . , and Kyb of the mask K for the input color data (Li, ai, bi) can be calculated, based on the color conversion characteristic values (AL, Ab, Aa), (BL, Ba, Bb), . . . , (HL, Ha, Hb) for the eight lattice points surrounding the input color data (Li, ai, bi).

In the above-described third embodiment, the color conversion data memory 212a stores therein the color conversion data (C', M', Y', K') of FIG. 8 which are previously obtained through the experimentation with the use of the printer 12 as described in the first embodiment. However, the color conversion data stored in the memory 212a are not limited to those obtained through the experimentation. The color conversion data may be simply calculated to be stored in the memory 212a. In this case, the color correction coefficient matrix M prepared with the use of the device 215 as described in the third embodiment can serve not only to omit the distortions in the Lab uniform color space in view of human visual perception but also to omit color differences caused by the color print characteristic of the printer 12, conversion error produced in the conversion device 212, and the like.

What is claimed is:

1. A color data conversion device for converting a set of input color data into a set of print control data for controlling a printing device, the color data conversion device comprising:

input means for inputting a set of input color data representing a desired color defined in a uniform color space;

color conversion means for converting the set of input color data into a set of print control data, while correcting distortion in the uniform color space, so as to produce the set of print control data capable of controlling the printing device to print out the same color as the desired color; and output means for outputting the set of print control data to a printing device so as to control the printing device by the print control data to print out the same color as the desired color;

wherein said color conversion means includes:

storing means for storing information on a distortion degree by which the uniform color space is distorted; and converting means for converting the set of input color data in a manner determined dependently on the distortion degree of the uniform color space.

2. A color data conversion device as claimed in claim 1, wherein the uniform color space is divided into a lattice to define a plurality of lattice color points, an input color point defined by the set of input color data being located in the lattice, and wherein said converting means includes:

a print control data table for storing information on a plurality of sets of print control data for the plurality of lattice color points, each set of print control data being capable of controlling the printing device to print out a color the same as the color represented by corresponding one of the plurality of lattice color points.

3. A color data conversion device as claimed in claim 2, wherein said converting means further includes:

first interpolation means for interpolating several sets of print control data for several lattice color points that surround the input color point, with the use of a set of first weight coefficients, the set of first weight coefficients being determined dependently on both the distortion degree of the uniform color space stored in the storing means and positional relationships between the input color point and the several lattice color points.

4. A color data conversion device as claimed in claim 2, wherein said storing means stores a color correction mask determined dependently on the distortion degree of the uniform color space, and wherein said converting means further includes:

color correction means for correcting the set of input color data with the color correction mask to obtain a corrected set of input color data, the corrected set of input color data defining a corrected input color point located in the lattice and shifted from the input color point; and second interpolation means for interpolating several sets of print control data for several lattice color points that surround the corrected input color point, with the use of a set of second weight coefficients, the set of second weight coefficients being determined dependently on positional relationships between the corrected input color point and the several lattice color points.

5. A color data conversion device as claimed in claim 4, wherein the color correction mask is determined dependently on the distortion degree of the uniform color space, the distortion degree being determined dependently on three attributes of color in regards to human visual sense.

6. A color data conversion device as claimed in claim 2, wherein the uniform color space is divided into a lattice to produce a plurality of cubes defined by the plurality of lattice color points, the input color point defined by the set of input color data being located in a particular cube, and wherein said storing means includes:

a cube state table for storing information on the distortion states of the plurality of cubes, the information on the distortion state of each cube indicating that a distortion state by which the uniform color space is distorted at the each cube corresponds to either one of several different distortion states, and wherein said converting means further includes:

third weight coefficient storing means for storing several sets of third weight coefficients for the respective ones of the several distortion states, each set of third weight coefficients being determined dependently on a corresponding distortion state;

cube determining means for determining the particular cube in which the input color point is located;

cube state determining means for determining the distortion state of the particular cube by referring to the cube state table;

third weight coefficient selecting means for selecting a set of third weight coefficients corresponding to the distortion state of the particular cube; and third interpolation means for interpolating several sets of print control data for several lattice color points that form the particular cube, with the use of the selected set of third weight coefficients.

7. A color data conversion device as claimed in claim 6, wherein each of the plurality of cubes is further divided into a plurality of sub-cubes, the input color point located in the particular cube being positioned in one specific sub-cube of the plurality of sub-cubes forming the particular cube, wherein said third weight coefficient storing means stores the several groups of third weight coefficients for the respective ones of the several distortion states, each group of third weight coefficients including a plurality of sets of third weight coefficients for the respective ones of the plurality of sub-cubes forming each cube, each set of third weight coefficients of each group being determined dependently on both the corresponding distortion state and a relative position of the corresponding sub-cube with respect to the corresponding cube, wherein said cube determination means further determines the specific sub-cube in which the input color point is located, wherein said third weight coefficient selecting means selects a set of third weight coefficients that corresponds to the distortion state of the particular cube and to the specific sub-cube, and wherein said third interpolation means interpolates the several sets of print control data for the several lattice color points that form the particular cube, with the use of the selected set of fourth weight coefficients.

8. A color data conversion device as claimed in claim 1, wherein the uniform color space is divided into a lattice to define a plurality of lattice color points, an input color point defined by the set of input color data being located in the lattice, wherein said storing means includes:

a distortion degree data table for storing a plurality of sets of lattice distortion degree data for the plurality of lattice color points, each set of lattice distortion degree data representing a distortion degree by which the uniform color space is distorted at an area around corresponding one of the plurality of lattice color points, and wherein said color conversion means further includes:

distortion degree interpolating means for interpolating several sets of lattice distortion degree data for several lattice color points that surround the input color point to calculate a set of input color distortion degree data representative of a distortion degree by which the uniform color space is distorted at an area around the input color point, said converting means converting the set of input color data in a manner determined dependently on the set of input color distortion degree data.

9. A color data conversion device as claimed in claim 8, wherein the set of lattice distortion degree data for each lattice color point is defined by a ratio of a first color distance defined in the uniform color space between the corresponding lattice color point and a first color point and a second color distance defined in the uniform color space between the corresponding lattice color point and a second color point, the first color point and the second color point being separated from the corresponding lattice color point in opposite directions by the same color difference as perceived by human visual sense.

10. A color data conversion device as claimed in claim 8, wherein the set of lattice distortion degree data for each lattice color point is defined dependently on MacAdam's color differentiation ellipses.

11. A color data conversion device as claimed in claim 8, wherein the set of lattice distortion degree data for each lattice color point is defined dependently on Munsell notation system.

12. A color data conversion device as claimed in claim 8, wherein said converting means further includes:

a print control data table for storing information on a plurality of sets of print control data for the plurality of lattice color points, each set of print control data being capable of controlling the printing device to print out a color represented by corresponding one of the plurality of lattice color points; and first interpolation means for interpolating several sets of print control data for several lattice color points that surround the input color point, with the use of a set of first weight coefficients, the set of first weight coefficients being determined dependently on both positional relationships between the input color point and the several lattice color points and the set of input color distortion degree data representative of the distortion degree by which the uniform color space is distorted at an area around the input color point.

13. A color data conversion device as claimed in claim 1, wherein the uniform color space is defined in a CIE 1976 Lab system.

14. A color data conversion device as claimed in claim 1, wherein the uniform color space is defined in a CIE 1976 Luv system.

15. A color data conversion device as claimed in claim 1, wherein the color conversion means converts the set of input color data into the set of print control data, while correcting the distortion in the uniform color space in regards to human visual sense, so as to produce the set of print control data capable of controlling the printing device to print out the same color as the desired color in regards to the human visual sense.

16. A color data conversion device for converting a set of input color data into a set of print control data for controlling a printing device, the color data conversion device comprising:

input means for inputting a set of input color data representing a desired input color defined in a uniform color space;

color conversion means for converting the set of input color data into a set of print control data representative of an output color having a predetermined color relationship with respect to the desired input color, the color relationship being predetermined in correspondence with the desired input color, to thereby produce the set of print control data capable of controlling the printing device to print out the output color;

output means for outputting the set of print control data to a printing device so as to control the printing device by the print control data to print out the output color;

a converting manner table for storing information on a plurality of converting manners determined for respective ones of a plurality of input colors inputtable by the input device, each of the plurality of converting manners being for converting the corresponding input color into an output color that has a corresponding one of a plurality of color relationships with respect to the corresponding input color; and converting manner selecting means for selecting one of the plurality of converting manners dependently on the desired input color inputted by the input device.

17. A color data conversion device as claimed in claim 16, wherein one of the plurality of converting manners converts a set of input color data representative of the corresponding input color into a set of print control data representative of an output color which is the same as the input color, the converting manner converting the set of input color data into the set of print control data while correcting distortion in the uniform color space.

18. A color data conversion device as claimed in claim 16, wherein another one of the plurality of converting manners converts a set of input color data representative of the corresponding input color into a set of print control data representative of an output color which is shifted from the input color by a predetermined color degree.

19. A color data conversion device as claimed in claim 16,
wherein the uniform color space is divided into a lattice to produce a plurality of lattice color points for forming a plurality of cubes, the input color point defined by the set of input color data being located in a particular cube, and further comprising:

a print control data table for storing information on a plurality of sets of print control data for the plurality of lattice color points, each set of print control data being capable of controlling the printing device to print out a color the same as a color represented by corresponding one of the plurality of lattice color points; and a cube state table for storing information on the color states of the plurality of cubes, the information on the color state of each cube indicating a color relationship predetermined for input colors located in the each cube;

wherein said converting manner table stores a plurality of sets of fourth weight coefficients each determined for attaining the color relationship predetermined for the corresponding color state;

wherein said converting manner selecting means includes:

cube determining means for determining the particular cube in which the input color point is located;

cube state determining means for determining the color state of the particular cube by referring to the cube state table; and a fourth weight coefficient selecting means for selecting one set of fourth weight coefficients predetermined for the color state of the particular cube determined by the color state determining means, and wherein said color conversion means includes:

fourth interpolation means for interpolating several sets of print control data, stored in the print control data table, for several lattice color points that form the particular cube, with the use of the selected set of fourth weight coefficients.

20. A color data conversion device for converting an input color data into a print control data for controlling a printing device, the color data conversion device comprising:

input means for inputting an input color data representing a desired input color;

color conversion characteristic determination means for determining a color conversion characteristic, based on the input color data;

conversion means for converting the input color data into a print control data, in a conversion manner having the determined color conversion characteristic; and output means for outputting the print control data to a printing device;

wherein said color conversion characteristic determination means includes:

color conversion characteristic memory means for storing a plurality of color conversion characteristic data; and color conversion characteristic selecting means for selecting one of the plurality of color conversion characteristic data based on the input color data, said conversion means converting the input color data into the print control data, in a conversion manner determined by the selected color conversion characteristic data.

21. A color data conversion device for converting an input color data into a print control data for controlling a printing device, the color data conversion device comprising:

input means for inputting an input color data representing a desired input color;

color conversion characteristic determination means for determining a color conversion characteristic, based on the input color data;

conversion means for converting the input color data into a print control data, in a conversion manner having the determined color conversion characteristic; and output means for outputting the print control data to a printing device;

wherein said color conversion characteristic means includes:

color conversion characteristic memory means for storing a plurality of color conversion characteristic data; and color conversion characteristic calculating means for calculating a desired color conversion characteristic data for the input color data, based on the input color data and the plurality of color conversion characteristic data, said conversion means converting the input color data into the print control data, in a conversion manner determined by the calculated color conversion characteristic data.

22. A color data conversion device for converting an input color data into a print control data for controlling a printing device, the color data conversion device comprising:

input means for inputting an input color data representing a desired input color;

color conversion characteristic determination means for determining a color conversion characteristic, based on the input color data;

conversion means for converting the input color data into a print control data, in a conversion manner having the determined color conversion characteristic; and output means for outputting the print control data to a printing device;

wherein said conversion means includes:

a plurality of conversion means for performing different conversion processes; and conversion manner selection means for selecting one of the plurality of conversion means, based on the determined color conversion characteristic.

23. A color data conversion device for converting an input color data into a print control data for controlling a printing device, the color data conversion device comprising:

input means for inputting an input color data representing a desired input color, wherein the input color data is defined in a uniform color space, the uniform color space being divided into a lattice to produce a plurality of lattice color points;

color conversion characteristic determination means for determining a color conversion characteristic, based on the input color data;

conversion means for converting the input color data into a print control data, in a conversion manner having the determined color conversion characteristic; and output means for outputting the print control data to a printing device;

wherein said conversion means includes:

color conversion value memory means for storing a plurality of color conversion values for the plurality of lattice color points, each of the plurality of color conversion values determining a print control data capable of controlling the printing device to print out a color represented by a corresponding one of the plurality of lattice color points;

a color conversion value selection means for selecting several color conversion values from said color conversion value memory means, based on the input color data; and a print control data calculating means for calculating a print control data for the input color data, based on the input color data and the selected color conversion values in the conversion manner having the determined color conversion characteristic.

24. A color data conversion device as claimed in claim 23, wherein said print control data calculation means includes:

first calculation means for calculating several values, based on the input color data in a manner corresponding to the conversion manner having the determined color conversion characteristic; and second calculation means for calculating the print control data, based on the several color conversion values selected by said color conversion value selection means and the several values calculated by said first calculation means.

25. A color data conversion device as claimed in claim 23, wherein said print control data calculation means includes:

coefficient memory means for storing a plurality of coefficients;

coefficient selecting means for selecting several coefficients from the plurality of coefficients, based on the input color data in a manner corresponding to the conversion manner having the determined color conversion characteristic; and calculating means for calculating the print control data, based on the several color conversion values selected by said color conversion value selection means and the several coefficients selected by said coefficient selecting means.

\* \* \* \* \*